(12) United States Patent
Bawri et al.

(10) Patent No.: US 8,745,045 B2
(45) Date of Patent: Jun. 3, 2014

(54) METHOD AND SYSTEM FOR SEARCHING AND RANKING ELECTRONIC MAILS BASED ON PREDEFINED ALGORITHMS

(75) Inventors: Malvika Bawri, Kolkata (IN); Vinay Bawri, Kolkata (IN)

(73) Assignee: Malvika Bawri & Vinay Bawri, Kolkata (IN)

( * ) Notice: Subject to any disclaimer, the term of this patent is extended or adjusted under 35 U.S.C. 154(b) by 118 days.

(21) Appl. No.: 13/297,949

(22) Filed: Nov. 16, 2011

(65) Prior Publication Data

US 2012/0124041 A1      May 17, 2012

Related U.S. Application Data

(60) Provisional application No. 61/458,064, filed on Nov. 17, 2010.

(51) Int. Cl.
*G06F 17/00* (2006.01)

(52) U.S. Cl.
USPC ............ 707/728; 709/206; 707/759; 707/748

(58) Field of Classification Search
USPC ........................... 707/728, 759, 748; 709/206
See application file for complete search history.

(56) References Cited

U.S. PATENT DOCUMENTS

| | | | |
|---|---|---|---|
| 7,359,936 B2 | 4/2008 | Gruen et al. | |
| 7,386,592 B2 | 6/2008 | Truty | |
| 7,509,385 B1 | 3/2009 | Rittmeyer et al. | |
| 7,593,995 B1 | 9/2009 | He et al. | |
| 7,627,561 B2 | 12/2009 | Pell et al. | |
| 7,627,565 B2 | 12/2009 | Budzik et al. | |
| 7,664,821 B1 | 2/2010 | Ancin et al. | |
| 8,224,836 B1* | 7/2012 | Piratla | 707/759 |
| 2005/0144241 A1 | 6/2005 | Stata et al. | |
| 2005/0172004 A1 | 8/2005 | Fisher | |
| 2006/0259494 A1* | 11/2006 | Watson et al. | 707/10 |
| 2008/0040435 A1 | 2/2008 | Buschi et al. | |
| 2008/0168026 A1* | 7/2008 | Patil et al. | 707/2 |
| 2009/0106676 A1 | 4/2009 | Brezina et al. | |

OTHER PUBLICATIONS

Sudarsky, S. and Hejelsvold, R., Visualizing Electronic Mail, 2002, Proceedings, Sixth International Conference on Jul. 10-12, 2002, pp. 3-9, IEEE.

* cited by examiner

*Primary Examiner* — Belix M Ortiz Ditren
(74) *Attorney, Agent, or Firm* — Global IP Counselors, LLP

(57) ABSTRACT

A method for searching a mailbox of a user to identify and present results relevant to the user's requirements. The mailbox comprises a plurality of e-mails. The method comprises receiving an input from the user specifying the user's requirements. The received input is used to identify one or more contexts of a search. The search is then conducted in the mailbox based on the identified context(s) to identify one or more results relevant to the input. The results are e-mails and/or e-mail attachments that match the user's requirements. The identified results are then ranked according to the extent of relevance to the received input. The results are ranked based on a plurality of pre-defined conditions. The results are then presented to the user on a display at the computer according to the ranking.

24 Claims, 14 Drawing Sheets

METHOD AND SYSTEM FOR SEARCHING AND RANKING ELECTRONIC MAILS BASED ON PREDEFINED ALGORITHMS

CROSS-REFERENCE TO RELATED APPLICATIONS

This application claims priority from U.S. provisional patent application 61/458,064, titled "Method And System for Searching and Ranking of Electronic Mails based on Predefined Algorithms", filed on Nov. 17, 2010, entire contents of which are incorporated herein by reference.

1. FIELD

The disclosed teaching relates to a method and system for searching and ranking of electronic mails (or e-mails) in a mailbox in a computer.

BACKGROUND

Communication tools and methods have evolved significantly over the past two decades, and have become a part of our everyday life. Individuals at corporate offices, business companies/enterprises, and various organizations rely heavily on these communication tools. There are various modes of communication, such as instant messaging, electronic mails (e-mails), telephones, and the like, through which people can interact with each other. The extensive growth and spread of the Internet over the past years has popularized some of these modes, especially e-mail. Sending and receiving e-mails has become one of the most relied upon ways of communication in corporate offices, business enterprises and organizations. Various types of e-mail applications used by the people today are Microsoft Outlook®, Gmail™, Yahoo!®, Hotmail®, Lotus Notes®, Thunder Bird®, and the like.

In general, e-mail provides a quick and easy way to stay in touch with family, friends, and business contacts, including co-workers, employers, and clients. It plays an important role in personal as well as professional communication. For instance, e-mail is used for communicating with friends, initiating a deal, interacting with clients, applying for a new job, and for almost all sorts of communication performed online. It is the most widely used mode of communication. In fact, most services on the Internet, even social networking sites such as Orkut®, Face Book™, and the like, ask for the user's e-mail address before allowing him/her to use their services. The importance of e-mail is only going to increase over time.

Each day, hundreds of e-mails are exchanged among friends, business contacts and business acquaintances. This results in a long list of e-mails in the user's mailbox. It becomes very difficult for the user to keep track of all the e-mails and to respond to them immediately. Therefore, one of the most challenging tasks in e-mail communication is to search and rank e-mails in the mailbox to facilitate retrieval of relevant e-mails when required.

Currently, the most prevalent method for searching e-mails in a typical mailbox is to look for an exact match of the search term and to show the matching results chronologically by date in a descending order. For example, when the user enters the keyword "patent", a search function searches the user's mailbox for all the e-mails that have the keyword. Once all the e-mails relating to the keyword are searched, a list of e-mails containing the keyword is displayed to the user in a chronological order. One of the shortcomings of this method is that since no specific weightage is given to any e-mail, the system performs a "blind search" on all the e-mails and displays matching search terms in a chronological order of date which results in many irrelevant results being shown at the top of the results. This method of searching for e-mails does not ensure that the most relevant e-mails to the given search term are shown at the top of the results.

Also, the existing methods and systems are unable to derive context of the search term input by the user. For example, if a person enters 10*4 in the Google search box, the Google algorithm is intelligent enough to understand the context that the user is in all probability searching for the product of the numbers 10 and 4, instead of treating the numbers as general search terms. The existing methods and systems of e-mail search fail to differentiate between keywords depending on the requirement. For example, keywords entered by the user that correspond to, say, a person or a domain name need to be treated differently for the search. Accordingly, there is a need to understand the context of the user's entry, i.e., whether the user is searching for e-mails from a particular person, e.g., a person named "Sam Spade," or a domain such as "uspto.gov" or "ebay.com." Existing methods are capable of searching by person but only if it is specified by the user that he/she is looking for a person. The existing systems are not intelligent enough to understand the context such as that understood by the Google search. As mentioned earlier, Google is able to understand that the user most probably wants to make an arithmetic calculation and not search for the words 10*4.

In light of the foregoing discussion, there is a need for a method and system to search for e-mails in a mailbox in a manner so as to identify results that are relevant to the user. Further, the method and system should rank the searched results based on their relevance. In addition to the above, the method and system should differentiate between the keywords depending on the search requirements or contexts.

SUMMARY

The disclosed teaching relates to a method for searching a mailbox of a user to identify and present results relevant to the user's requirements. The mailbox comprises a plurality of e-mails. The method comprises receiving an input from the user specifying the user's requirements. The received input is used to identify one or more contexts of a search. The search is then conducted in the mailbox based on the identified context(s) to identify one or more results relevant to the input. The results are e-mails and/or e-mail attachments that match the user's requirements. The identified results are then ranked according to the extent of relevance to the received input. The results are ranked based on a plurality of pre-defined conditions. The results are then presented to the user on a display at the computer according to the ranking.

In an specific enhancement e-mails are displayed to the user that are relevant to him/her.

In another specific enhancement a search is conducted by identifying the context of various keywords/search terms input by the user.

In yet another specific enhancement e-mail attachments are ranked.

In another specific enhancement an e-mail chain for presentation of results of a search are identified.

In still another specific enhancement automatic creation of folders and indexes while presenting the results of a search is facilitated.

In a subsequent enhancement commercial e-mails are identified for presenting the results of a search.

BRIEF DESCRIPTION OF THE DRAWINGS

The various exemplary implementations of the disclosed teachings will hereinafter be described in conjunction with the appended drawings, provided to illustrate, and not to limit, the invention, wherein like designations denote like elements, and in which.

DETAILED DESCRIPTION

The disclosed teachings describes a method and system for facilitating searching and ranking of e-mails in a mailbox. The system facilitating searching and ranking of e-mails corresponds to, but not limited to, a plug-in which is integrated with an e-mail application. The present invention has been described considering that the system is a plug-in, but should not be considered limited to a plug-in only. A person skilled in the art will appreciate that the system can be implemented in other ways, such as the features and capability may be pre-programmed within the e-mail application. It may be hard wired into the application itself by anyone who acquires the rights to use the search methodology of the present invention. Searching and ranking of the e-mails in the mailbox is performed based on one or more pre-defined algorithms. The pre-defined algorithms described herein may include various searching and ranking algorithms applied to perform various types of searches and rankings that have been described in detail in conjunction with the description of the accompanying drawings. Accordingly, the pre-defined algorithms may vary with the scopes of various types of searches.

Figure 1:
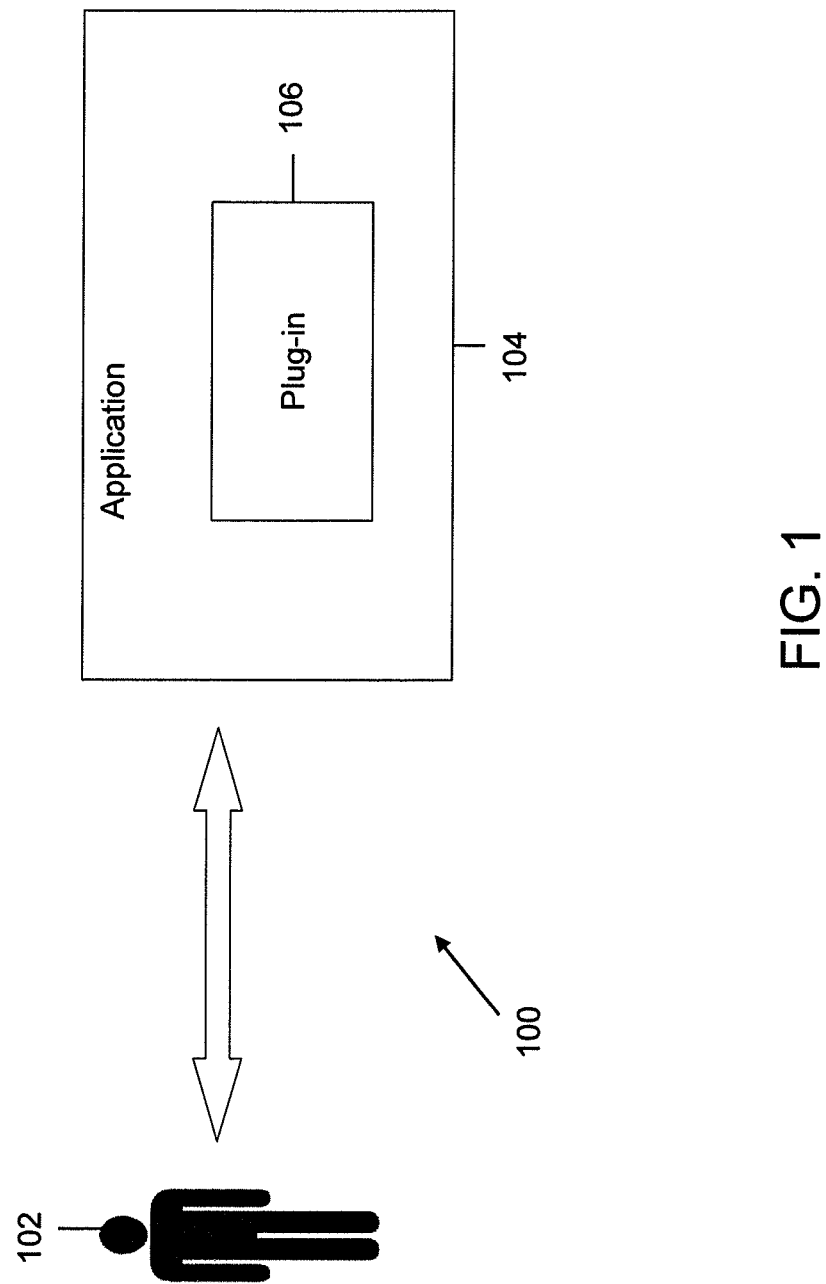
FIG. 1 illustrates an exemplary environment in which various exemplary implementation of the disclosed teachings may be practiced.

FIG. 1 illustrates an exemplary environment 100 in which various embodiments of the present invention may be practiced. An environment 100, as shown in FIG. 1, includes a user 102, an application 104, and a plug-in 106. User 102 uses a Data Processing Unit (DPU, not shown in the figure) to access application 104. Examples of the DPU described herein include, but are not limited to, a personal computer, a laptop, a personal digital assistant (PDA), a smart phone, a mobile computing device, and the like. Further, the various types of application 104 can be, but are not limited to, e-mail applications, for example, Microsoft Outlook®, Gmail™, Yahoo!®, Hotmail®, Lotus Notes®, Thunder Bird®, and the like. Further, plug-in 106 is integrated with application 104 to facilitate searching and ranking of e-mails and attachments in a mailbox. Plug-in 106 also facilitates creation of folders and indexes, and identification of commercial e-mails and the like.

Further, plug-in 106, as described above, may correspond to an add-on, add-in, toolbar, and the like. In one exemplary implementation of the disclosed teachings exemplary implementation of the disclosed teachings, plug-in 106 may be embodied in the form of software. In another exemplary implementation of the disclosed teachings, plug-in 106 may be embodied in the form of hardware. In yet another exemplary implementation of the disclosed teachings, plug-in 106 may be embodied in the form of a combination of hardware and software.

An exemplary implementation of the disclosed teachings is described herein to understand the broader aspect of the disclosed teachings. According to this embodiment, it can be assumed that user 102 uses an e-mail application 104, such as Microsoft Outlook®, which is used to receive or send e-mails. The e-mails are exchanged with various businesses and personal contacts of user 102. When the user opens Microsoft Outlook®, plug-in 106 is activated automatically. After such activation, plug-in 106 provides an interface to user 102 to perform one or more functions, such as searching and ranking of the e-mails. The interface described here includes a Graphical User Interface (GUI) with a dropdown menu, a checkbox, a text box, and the like. For instance, when user 102 wishes to search for a particular keyword(s) (or search term(s)), he/she can input the search term(s) in the text box of the interface provided by plug-in 106. After receiving the search term(s) from user 102, plug-in 106 searches for the term and its variations in the mailbox of user 102 and identifies all the relevant e-mails/attachments pertaining to the search term(s). Thereafter, the identified e-mails/attachments are ranked according to their relevance based on a pre-defined algorithm (discussed below). Once all the e-mails are ranked by plug-in 106, accordingly, all the identified e-mails/attachments are displayed to user 102.

Plug-in 106 can perform various types of searches to identify relevant e-mails before ranking them. Algorithms associated with various types of searches and rankings will be described in detail in the description of the subsequent figures.

In an exemplary implementation of the disclosed teachings, the plug-in interface also includes a dropdown menu. The dropdown menu may contain advanced search options such as, but not limited to, search in attachments, search in log-in passwords, occurrences of alphanumeric characters, search in commercial mails, and the like.

Figure 2:
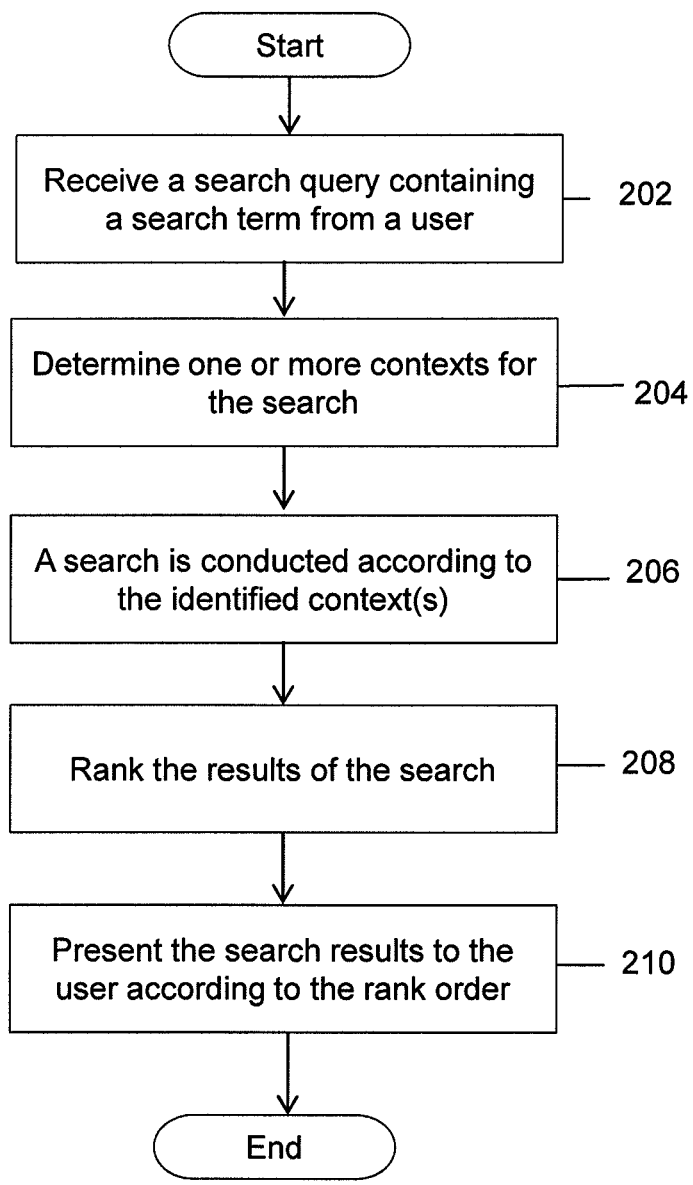
FIG. 2 is a flowchart illustrating a method for searching the mailbox of a user and presenting the search results, in accordance with an exemplary implementation of the disclosed teachings.

FIG. 2 is a flowchart illustrating a method for searching the mailbox of a user and presenting the search results, in accordance with an exemplary implementation of the disclosed teachings. The mailbox is searched to identify search results that are relevant to the user's requirements. The search results may include e-mails and e-mail attachments, as per the requirements of the user. At 202, an input for the search is received from user 102. User 102 specifies his/her requirements in the input. The input can be in the form of one or more keywords or search terms. In addition to providing one or more search terms, the user may opt to select one of the advanced search options given in the drop-down menu provided by plug-in 106. For example, the user may input "patent.jpg" as a search term. At 204, plug-in 106 determines at least one context of the search using the received user input. Plug-in 106 determines the context out of pre-defined contexts. For example, for input "patent.jpg", it is determined that the user is looking for an attachment that has term "patent" in the file name and is a .jpg file. The process of determining the context is described in detail with reference to FIGS. 3a and 3b. Once the context is determined, a search is accordingly conducted in the user's mailbox at 206. For example, the search will be conducted only in e-mail attachments to look for .jpg files that have term "patent" in the file name, since the context determined is "attachment with a specific name and type". The process of searching the mailbox is described in detail later with reference to FIGS. 3a, 3b, 5, 6, 7, 8, 9, 10, 12 and 13. Once the search results are identified, at 208, the results are ranked in the order of relevance to the user's input, based on pre-defined conditions. The process of ranking the search results is described in detail with reference to FIG. 4. At 210, the search results are presented to the user in the order of the ranking.

Figure 3A:
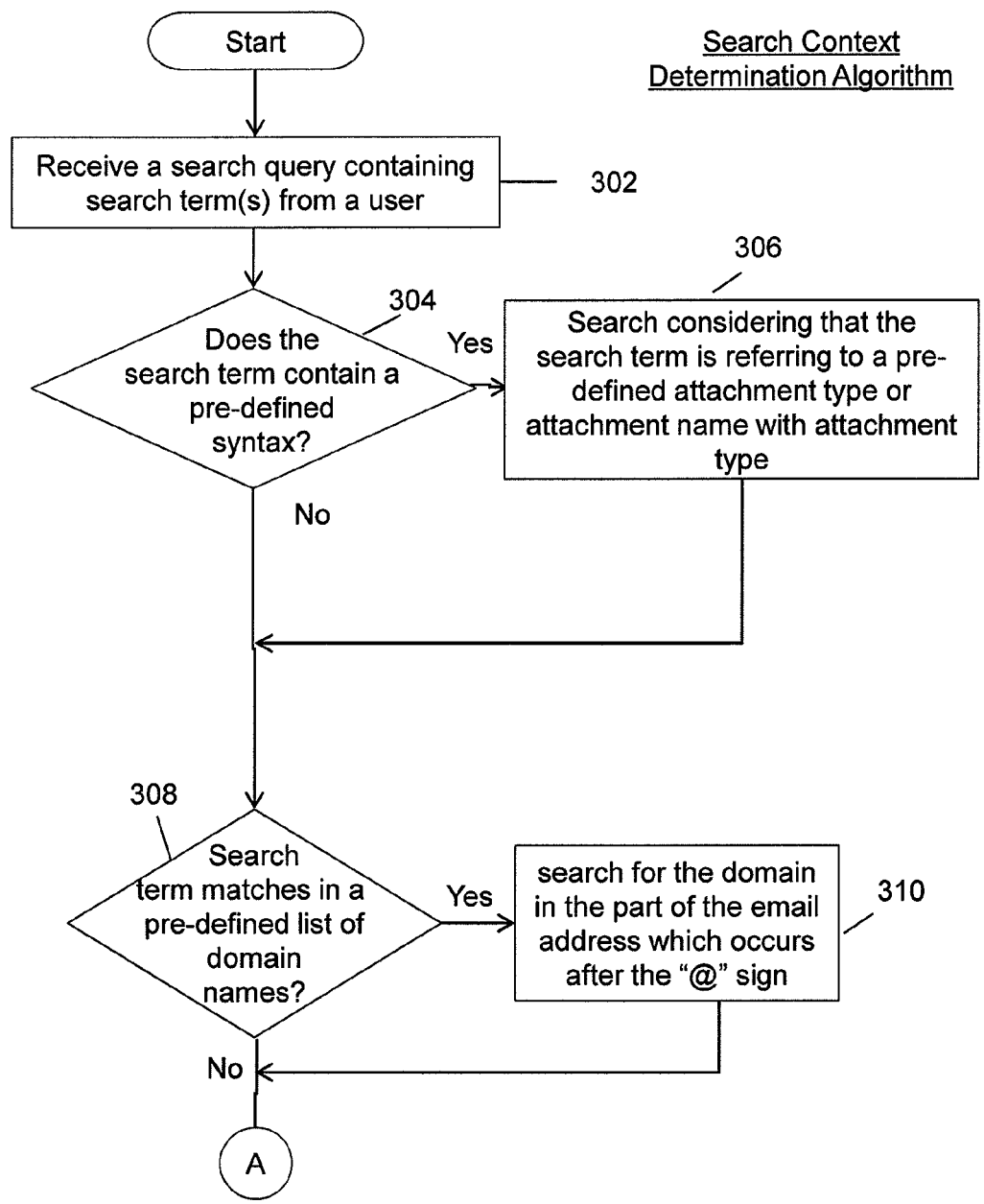
FIGS. 3a and 3b are flowcharts illustrating a method for determining one or more contexts of the search using the search term(s) input by a user and accordingly conducting the search, in accordance with an exemplary implementation of the disclosed teachings.
Figure 3B:
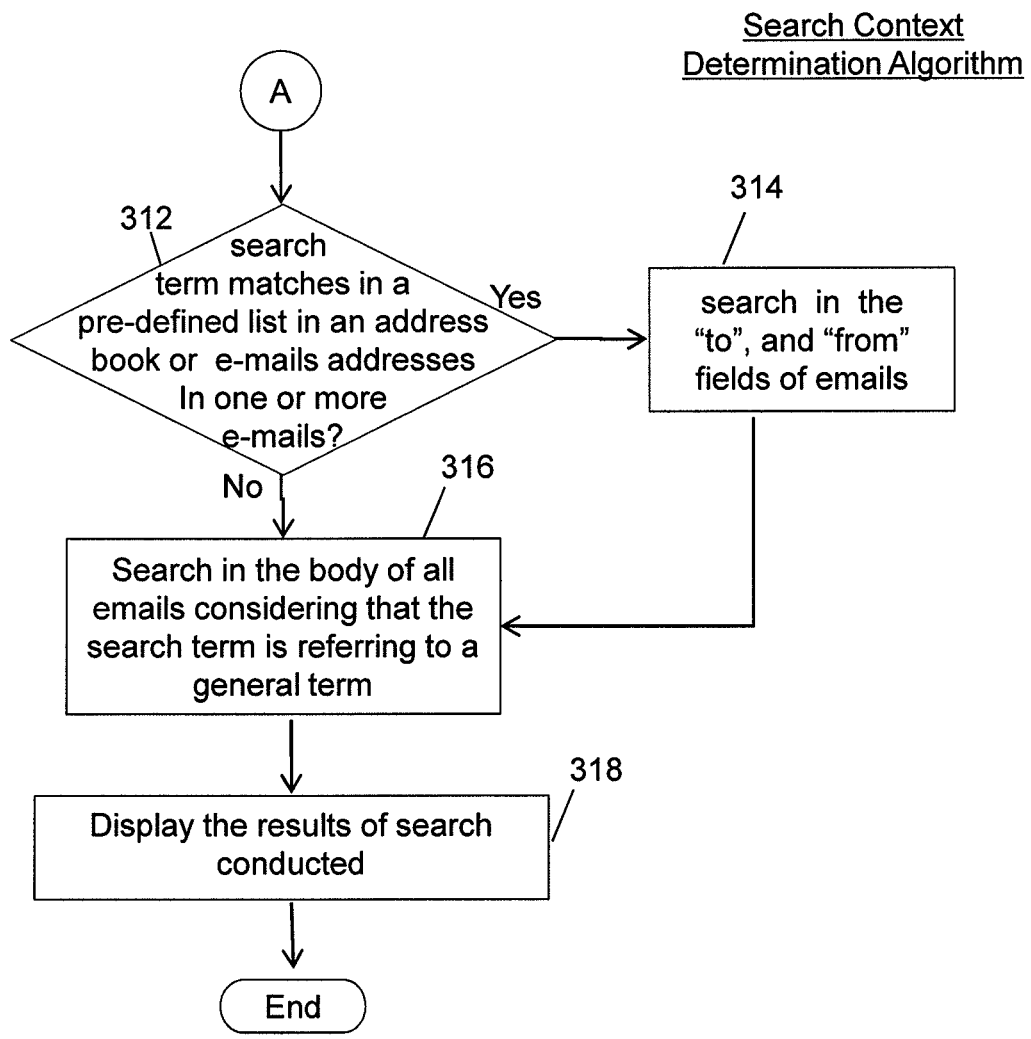

FIGS. 3a and 3b are flowcharts illustrating a method for determining one or more contexts of the search using the search term(s) input by a user and accordingly conducting the search, in accordance with an exemplary implementation of the disclosed teachings.

At 302, a search query containing one or more search terms is received from user 102. The search term(s) is input by the user in a text box of an interface provided by plug-in 106. For each search term, a check is performed at 304 to check if a pre-defined syntax is present in the search query. Each of the predefined syntax corresponds to a context related to e-mail attachments. If a predefined syntax is identified, the method moves to 306. For example, at 304, the system identifies a period sign (.) in conjunction with an attachment type with a space preceding and following it, for example <space>.jpg<space>, and understands that the user is looking for e-mails with attachments and attachment type jpg.

At 304, it is affirmed that the search term refers to one of the following:
"attachment with an attachment type"
"attachment name with attachment type"
"an attachment"

Examples of pre-defined syntaxes may include, but are not limited to, special characters, numeric characters, alphabetic characters, alphanumeric characters, and the like. For example, when the search term contains a pre-defined syntax, such as ".doc" it is determined that the search term is referring to a .doc attachment type, similarly syntax "patent.doc" refers to an attachment file name "patent" that is of .doc type. The pre-defined attachment types may include, but are not limited to, picture, video, music file, Microsoft Excel and Microsoft Word file. If a pre-defined syntax is identified at 304, the system conducts a search based on the search term(s) according to the identified context at 306. In other words, at 306, e-mails are searched to identify e-mails that contain an attachment matching the requirement. The process then moves to 308. Also, if a predefined syntax is not identified at 304, the process moves to 308.

At 308, a check is performed to determine whether the search term matches any domain name in a pre-defined list of domain names and/or a list of domain names existing in the user's e-mails.

The pre-defined list of domain names contains one or more domains, such as Gmail.com, Yahoo.com, eBay.com, uspto.gov, and so forth. Thus, if the search term is found in the pre-defined list of domain names and/or a list of domain names already contained in the user's e-mails, it is affirmed that the search term refers to a domain. At 310, a search is conducted to identify e-mails that have been sent from the identified domain by searching in the part of the e-mail address which occurs after the "@" sign. Thereafter, the process moves to 312.

If the check at 308 is false, the system moves to 312. At 312, it is checked if the search term matches with any contact in a pre-defined list, such as an address book or contacts present in appropriate fields of e-mails in the user's mailbox. In an exemplary implementation of the disclosed teachings, the pre-defined list contains one or more contacts of the user, such as friends, relatives, colleagues, clients or customers, and the like. The e-mail addresses could also be extracted from the body of the e-mails of the user.

Further, if the result of the check performed at 312 is true, the system understands that the context of user's search is "person", i.e., the search term provided by the user refers to a person. At 314, the search is conducted in the "TO", "From" and "CC" fields of the e-mails to identify e-mails sent by the identified person and sent to the identified person. In case the result of the check at 312 is false, the method moves to 316.

At 316, the system considers the context of the search term(s) as 'general'. Under this context, the system searches for the search term in other sections of the e-mails, such as the subject line, the e-mail body. Thereafter, at 318, the results of the search(s) conducted at 306, 310, 314 and 316 are presented to the user. In an exemplary implementation of the disclosed teachings, the results of search(s) are ranked according to the context of the search.

A search term is checked against all contexts as shown in FIGS. 3a and 3b. For example, consider that the user enters "ebay" as a search term. The system will check at 304 that "ebay" does not satisfy any predefined context. At 308, the system identifies that 'ebay' refers to a domain and identifies all e-mails from the domain as search results. However, the process does not stop here. The system will check for "ebay" in the address book at 312 and identify that it does not refer to any person. The system then checks for "ebay" as a general term at 316 and searches for e-mails where "ebay" occurs in the e-mail body. The process has been defined considering that a search term may satisfy more than one context. In other words, the process has been defined in a way that irrespective of a match with one context, the process will still check for matches with other contexts and conduct the searches accordingly. The process differentiates between contexts such that the search is carried out for each identified context.

Thus, as described, a context is associated with the search term(s). The pre-defined contexts are "attachment", "attachment type" "attachment name with attachment type," "domain name," "person," and "general term" which includes the subject line of the e-mail, the body of the e-mail as well as the "attachment name" of the e-mail if any.

It should be apparent to a person skilled in the art that the steps mentioned above are not restricted to a particular order, and any check may be performed in the series of checks in any order.

For further understanding of the invention, various examples of the search terms have been shown below to ascertain the corresponding context for the search using the search term(s).

In an exemplary implementation of the disclosed teachings, it may be assumed that the search term(s) received from the user contains a pre-defined syntax. For example, the pre-defined syntax may be ".doc." As per 304 and 306 explained above, it is affirmed that the search term containing ".doc" corresponds to an attachment in an e-mail, where the attachment type is of "doc" format. Hence, the context based on the received search term is "e-mail having attachment with attachment type".

The pre-defined attachment types may include picture (.jpg, .jpeg), video (.mp4), music files (.mp3), Microsoft Excel (.xls) and Microsoft Word files (.doc) and the like.

Further, if the attachment type pertains to particular pre-defined attachment types, such as particular attachment types for music files or picture files, the system determines that contents of relevant e-mails, such as subject, body of the e-mail need not be displayed and the attachments and contents of the attachment can be directly displayed.

The system then directly displays the attachments or the contents of the attachments associated with those e-mails at 318. This enhances the efficiency of the system in searching and presenting results, and reduces the complexity involved in the process. Thus, directly displaying the attachments based on the search term is more effective than displaying contents associated with the body of an e-mail as it saves the user a lot of time and hassle and is a more effective way of handling such searches.

For example, a user searches for all e-mails from person Sam to person Spade, with an attachment of .jpg format. Using the received input "emails from person Sam to person Spade", the system determines that the user is looking for emails sent by Sam to Spade. Similarly, using the received input "emails from person Sam to person Spade", the system determines that the user is looking to view pictures. Since both inputs are provided by the user simultaneously, the system determines that the user is looking for pictures in .jpg format that have been sent by Sam to Spade. Effectively, all the pictures associated with such search results (e-mails) are displayed directly, instead of showing the content of the relevant e-mails. In traditional methods, the system will show results with the "From" and "To" senders names, e-mail addresses and the body of the e-mail address and the file name at the bottom of the e-mail. If the file name matches what the user is looking for then the user may open the said attachment. This is a very laborious process for the user. It can be safely assumed that if the user has specified that he is looking for an attachment, it is the attachment itself that the user is interested in and not the contents of the e-mail. Therefore, it is far more efficient to display the attachment in particular cases of pictures, videos, music files and the like. In case of multiple matching attachments, all the contents of the attachments will directly be displayed. For example, in case of 2 attachments of .jpg (picture) format, both the pictures will directly be displayed as results instead of the matching e-mails with subject and body and attachment name being displayed. These pictures or contents are displayed to the user by reducing the size, in order to accommodate multiple pictures or attachment contents on the user's screen. The size is not reduced less than a pre-defined minimum size so that the contents remain viewable. Multiple pictures or other attachment contents are included as a list so that the user can scroll through the attachments.

Further, each picture will have a link to the particular e-mail, and the user can view the e-mail if required. Similar steps can be followed for, but not limited to, music and video files, Microsoft excel and Microsoft word files as described above.

To further explain the process using another example, consider that the user inputs "vinay" as a search term. On the basis of the check at 312, it may be identified that the search term is present in the user's address book. Accordingly, it is affirmed that the search term refers to a person, and thus, the context based on the search term is "person." In another example, a search term received from the user may be "Gmail" and it is determined, on the basis of the check at 308, that the search term is present in the pre-defined list of domain names. Accordingly, it is affirmed that the search term refers to the "domain" context. In yet another scenario, when the search term received from the user is "patent," and it does not satisfy the conditions at 304, 308 and 312, it is ascertained that the search term refers to a general term. Accordingly, the context of the search is only "general term."

As discussed in FIGS. 3a and 3B, after determining the context of the search term, a search is performed using the search term and context information at 306, 310, 314 and 316. The search is conducted based on pre-defined algorithms. The pre-defined algorithms for searching are described in detail in conjunction with FIGS. 3a, 3b, 5, 6, 7, 8, 9, 10, 12 and 13.

Figure 4:
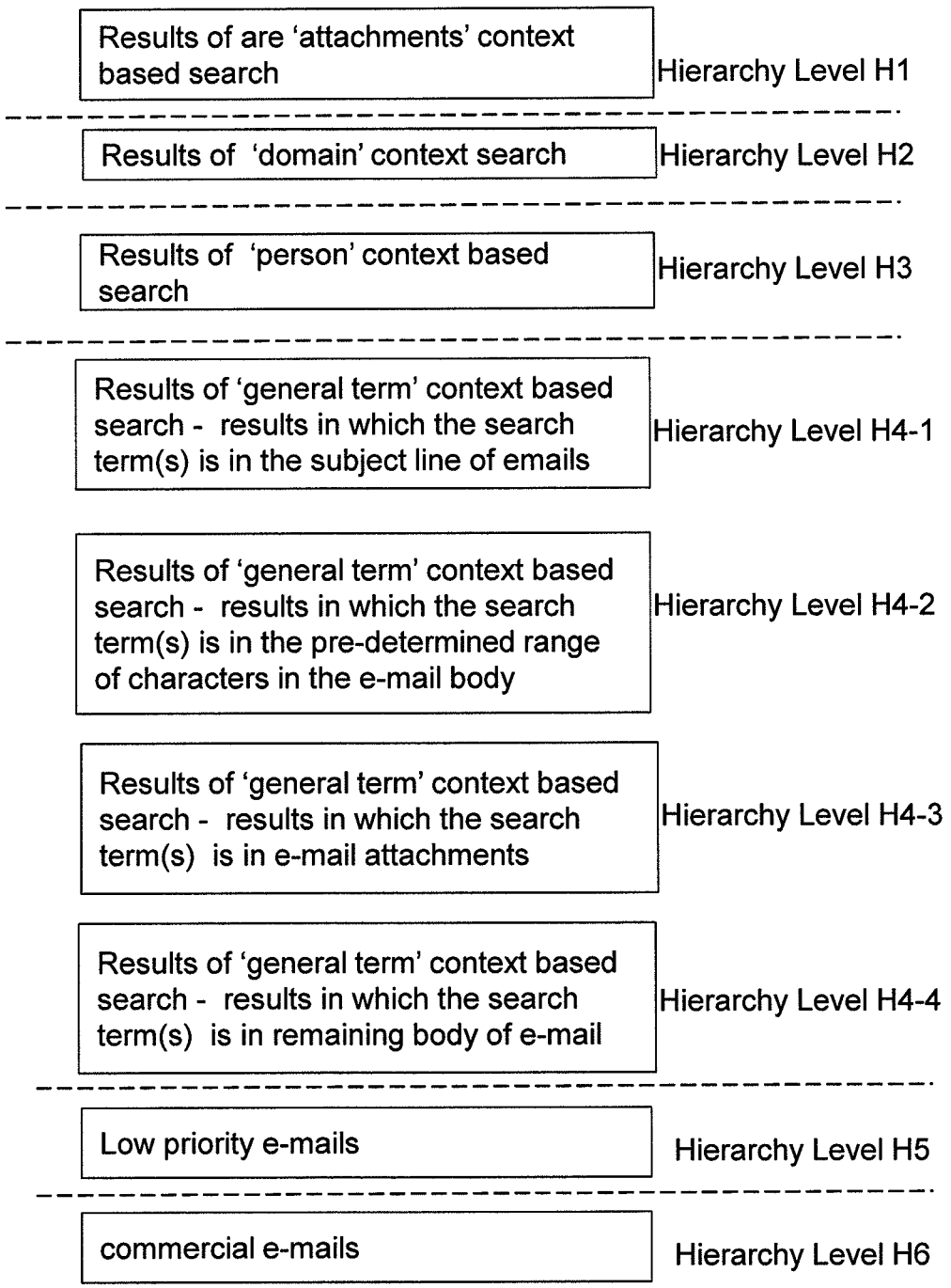
FIG. 4 represents a hierarchy level arrangement for ranking search results, in accordance with an exemplary implementation of the disclosed teachings.

FIG. 4 represents a hierarchy level arrangement for ranking search results, in accordance with an exemplary implementation of the disclosed teachings.

After identifying the search results, the ranking process of the search results initiates. The search results are ranked based on one or more predefined conditions, as discussed in FIG. 4. Hierarchy levels (H1, H2, H3 and H4) are respectively provided to search results that are identified based on the contexts, "attachment", "domain", "person" and "general term". The results within hierarchy level H1 (that is, attachments) are further arranged based on contexts "attachment with an attachment type", "attachment name with attachment type" and "an attachment". In addition, the attachments are arranged within hierarchy level H1, based on the pre-defined conditions of containing the search term(s) in the attachment name, and whether the text in the attachment is found in a pre-defined format, such as large font, bold, underlined, capitalized, italicized, and any combination of the same.

For certain types of files that have text in them, the system first calculates the font size of word(s) and compares the average font size of the document as well as the color of the words compared to the primary font. In another example, the system checks words that are in bold, capitalized words, whether the text in the entire document is of the same color or not, and so forth. Then, the system looks for a combination of text in e-mails with respect to parameters such as font size, capitalization, boldening effect, color scheme, italicization, or underlining effect. Attachments in which the pre-defined format is identified for the search term(s), such as bold, italic, underlined, colored, large font, use of bullets, and the like are ranked high in hierarchy level H1. In another exemplary implementation of the disclosed teachings, attachments with search term(s) in a simple format, such as search term(s) in the attachments that are neither bold nor underlined are ranked lower in hierarchy level H1.

Further, it has been found in software trials that attachments containing worksheets with calculations, for example, Excel spreadsheets as well as databases containing a list of attendees to a meeting, have less importance than attachments containing 'plain' text. Accordingly, these types of attachments containing worksheets are ranked lower than other types of attachments irrespective of whether they conform to the requirements specified earlier, like that of a larger font size, capitalization, etc.

The idea is to capture headings and sub-headings, and the text that have been emphasized in italics or in bold or have been underlined in order to find a simple way to capture the important elements of the attachment and to calculate the importance of the attachment corresponding to a search query entered by the user.

For the sake of clarity, the above-mentioned steps are also explained with the help of an example. In this example, it can be assumed that the search terms received from the user is "patent research", and the system has identified related attachments. Thereafter, attachments with matched search terms "patent research" in various font characteristics, such as large, capitalized, underlined, bold, as mentioned earlier, are ranked high. Further, attachments with search term(s) in a simple format, such as search term(s) in the attachments that are neither bold nor underlined are ranked lower.

Similarly, attachments are also ranked based on a condition check. The condition check can involve identifying whether the e-mail of which the attachment is a part was sent to the user with the user being in the "To" field or the "CC" field. The attachment which is sent with the user in the "To" field is ranked higher than the attachment with the user in the "CC" field. A further methodology of ranking and displaying these types of attachments can be based on user ratings, last opened date, number of times the attachment has been opened, and the like.

The results identified using the context 'general term' are further ranked within hierarchy level H4 based on pre-defined conditions. Hierarchy level (H4-1) is provided to search results that fulfill the pre-defined condition of containing the search term(s) in the subject line of the e-mail. Hierarchy level (H4-2) is provided to search results that fulfill the pre-defined condition of containing the search term(s) in the pre-determined range of characters in the e-mail body. Hierarchy level (H4-3) is provided to search results that fulfill the pre-defined condition of containing the search term(s) in the e-mail attachments. Hierarchy level (H4-4) is provided to search results that fulfill the pre-defined condition of containing the search term(s) in the remaining body of the e-mail, i.e., in the e-mail body excluding the subject line and within the predetermined range of characters. Also, all results arranged in the above-mentioned hierarchy levels are further arranged by bringing down the e-mails in the hierarchy that are commercial and low-priority. These e-mails are respectively assigned hierarchy levels H5 and H6 as shown in FIG. 4. The process of identifying commercial and low-priority e-mails is described later with reference to FIGS. 12 and 13. Within each hierarchy level (H1, H2, H3, H4-1, H4-2, H4-3, H4-4, H5 and H6), results are further arranged based on the sent or received date of e-mails. Also, attachments within H4-3 are arranged as explained earlier with respect to hierarchy level H1. After assigning the hierarchy levels to search results, the results are then displayed to the user.

For the sake of clarity, the above-mentioned steps are also explained with the help of an example. After receiving one or more search terms, such as "patent," one or more search results are determined. Thereafter, one or more condition checks are performed to rank the e-mails based on the checks performed as described above. Consider that the only context for the search is "general term" and hierarchy levels H4-1, H4-2, H4-3 and H4-4 are assigned. The search results are then ranked according to the Hierarchy levels assigned at these steps. The ranked results are then displayed to the user.

The hierarchy levels as shown in FIG. 4 should not be considered as limiting the disclosed teachings. The ranking of results according to the hierarchy levels is according to an exemplary implementation of the disclosed teachings. The present invention also supports ranking the search results according to other hierarchy levels.

Figure 5:
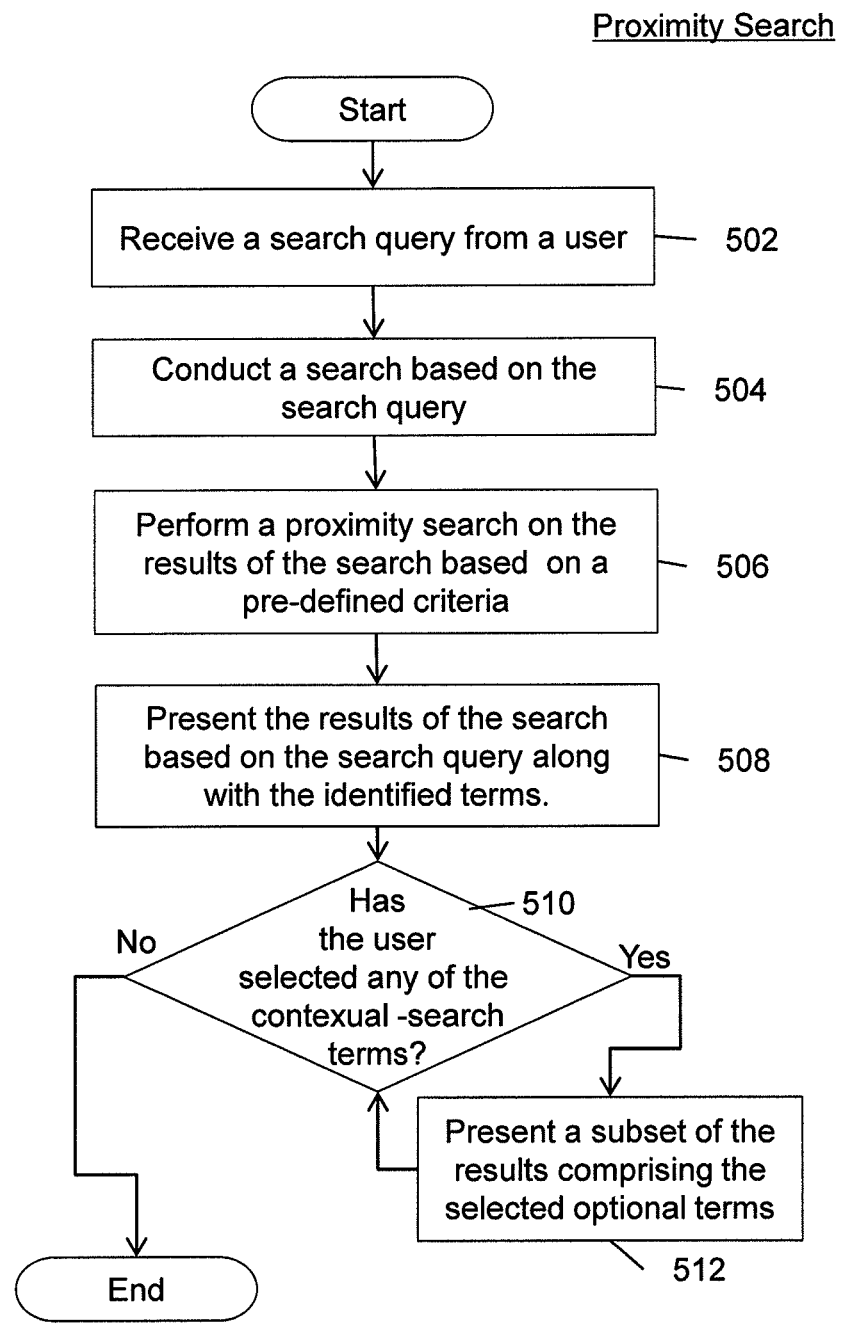
FIG. 5 is a flowchart illustrating a method for performing a proximity search, in accordance with an exemplary implementation of the disclosed teachings.

FIG. 5 is a flowchart illustrating a method for performing a proximity search, in accordance with an exemplary implementation of the disclosed teachings. In an exemplary implementation of the disclosed teachings, the "proximity search" may be defined as the type of search where terms adjacent to the provided search term(s) are also examined.

At 502, a search query containing one or more search term(s) is received from a user 102. At 504, a search is conducted based on the received search query as mentioned in FIGS. 3a, 3b, 5, 6, 7, 8, 9, 10, 12 and 13 to identify results. Thereafter, at 506, a proximity search corresponding to each search term is performed based on a pre-defined criterion. The proximity search is performed on results in which the search term(s) are present in the subject of e-mails.

In an exemplary implementation of the disclosed teachings, the pre-defined criterion may include checking the terms to the immediate left and right of the matching search term in the e-mail subject. If the terms to the immediate left and right of the matching search term contain conjunctions/articles, the conjunctions/articles may be ignored.

Further, the search is continued to check the next word to the left or right until the system finds a word that is not a conjunction/article. Subsequently, proximity search in an e-mail is stopped when a word other than the conjunctions/articles is found. However, if the terms to the immediate left and right of the matching search term do not contain any conjunctions, the words to the immediate left and right of the matching search term are considered as contextual-search terms. Contextual-search terms identified from search results are analyzed to select contextual-search terms with more than a minimum number of occurrences. At 508, the selected contextual-search terms are presented to the user along with the results of the search conducted at 504. The contextual-search terms provide different contexts in which the search term(s) of the search query have been used in the results. At 510, the system checks if the user has selected any of the presented contextual-search terms. If the user selects any contextual-search terms, at 512, the system presents only those results of the search in which the contextual-search terms are present in the e-mail subject. In other words, the system presents a subset of the results of the search conducted at 504 in which the selected contextual-search terms are present.

To further elaborate on the flowchart described above, an example has been described. It can be assumed that the search term received from the user is "patent." After receiving the search term, a search is performed to identify results according to the method described in FIGS. 3a, and 3b. A proximity search is performed on the identified results based on the pre-defined criterion mentioned above. For example, consider that many e-mails contain "Firms for patent research" in the subject and many other e-mails contain "provisional patent application" in the e-mail subject. The contextual-search terms identified from these results are "'firms' and 'research'" and "'provisional' and 'application'". These contextual-search terms, "'firms' and 'research'" and "'provisional' and 'application'", are presented to the user along with the results of the search based on "patent" as the search term. In case the user selects contextual-search terms "'provisional' and 'application'", only the results that contain 'provisional' and 'application' as contextual-search terms corresponding to search term 'patent' are presented. Also, contextual-search terms 'provisional' and 'application' are highlighted in the displayed results for user's convenience. Contextual-search terms help the user narrow down results based on the context in which the entered search terms are used in e-mails, without going through the search results. Another application of contextual search terms is to show related terms/subjects to the user which are related to his search term. If the user is not able to find the results with the search term that he has entered, he is given a 'thesaurus type' list of similar contextual terms. As a result, the user can efficiently narrow down the search results as per the context of usage in which the user is interested.

Figure 6:
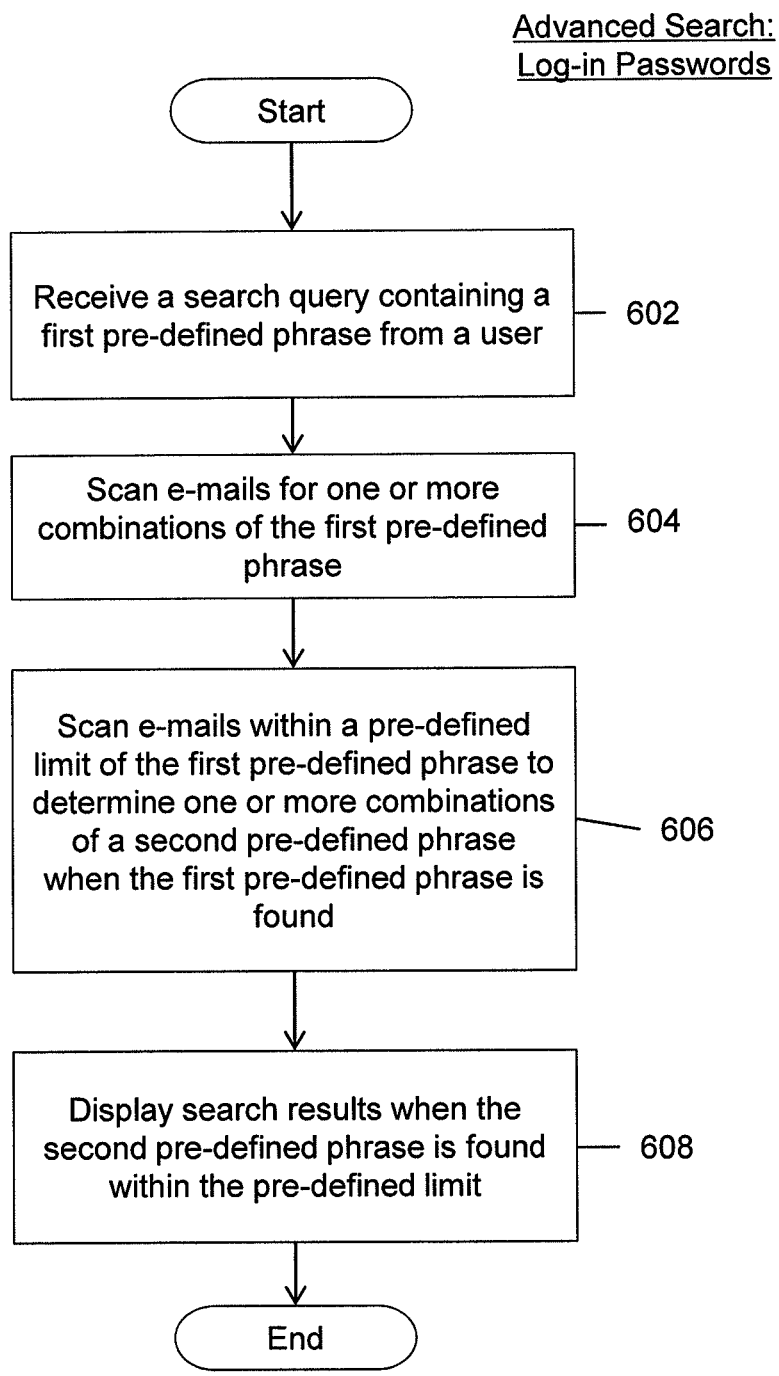
FIG. 6 is a flowchart illustrating a method for performing an advanced search for log-in passwords, in accordance with an exemplary implementation of the disclosed teachings.

FIG. 6 is a flowchart illustrating a method for performing an advanced search for log-in passwords, in accordance with an exemplary implementation of the disclosed teachings.

At 602, a search request for log-in passwords is received from a user 102. In an exemplary implementation of the disclosed teachings, the user enters the search request by checking a check box for conducting the log-in passwords search. In addition, the user may input one or more search terms along with checking the check box for the log-in passwords search. At 604, the system searches for e-mails containing a first phrase. The first phrase may be any of the phrases listed in a pre-defined list of first phrases. The pre-defined list of first phrases comprises variations of "user ID", such as "account ID", "account name", "Account number", "user name", "log-in name", "log-in account", "log-in number". In case the user has also input one or more search term(s). The system searches for e-mails that contain a first phrase and match the input search terms(s) (as per the method mentioned in FIGS. 3a, and 3b). After identifying the e-mails, at 606, the system scans the identified e-mails within a pre-defined limit or proximity of the first phrase to determine a second phrase. The second phrase may be any of the phrases listed in a pre-defined list of second phrases. The pre-defined list of second phrases comprises variations of "passwords", such as "password", "pin number", and "pin", and their pre-defined formats, such as "term with at least one alpha-numeric or special character". In an exemplary implementation of the disclosed teachings, the first phrase and the second phrase may be obtained within certain pre-defined proximity, such as 75 characters with each other. Subsequently, at 608, the search results are displayed to the user in which the second phrase is found within the pre-defined limit. Accordingly, only the e-mails that contain the first pre-defined phrase and the second pre-defined phrase are displayed as the search results. In an alternative embodiment, "user ID" and "password" is captured from each e-mail and the list of "user IDs" and "passwords" is presented to the user. An example list is given below:

| User ID | Password |
|---|---|
| Vinay123@amazon.com | 123$abc |
| Vinay.bawri@gmail.com | QWER@#$ |
| Vinaybawri@facebook.com | Sp@ce45 |

When the user only checks the check-box at 602 and does not input any search query, the system returns all e-mails in which different accounts' log-in and passwords information is present. When the user enters one or more search term(s) along with checking the check-box, the system uses the search term(s) to narrow down the search results for the log-in passwords search. The search term(s) may be an e-mail address (e.g., registration@amazon.com), a person's name (e.g., Sam Spade), or a domain name (e.g., amazon.com) or a general term. For example, if the user enters "vinay.bawri" as the search term along with checking the check box, the system identifies e-mails in which "vinay.bawri" is present along with account log-in and password information. Consider another example where the user enters "amazon" as the search term and checks the check-box for log-in passwords search. In this case, the system searches for e-mails that are from/to domain Amazon or contain general term "amazon" along with an account's log-in and password information.

Figure 7:
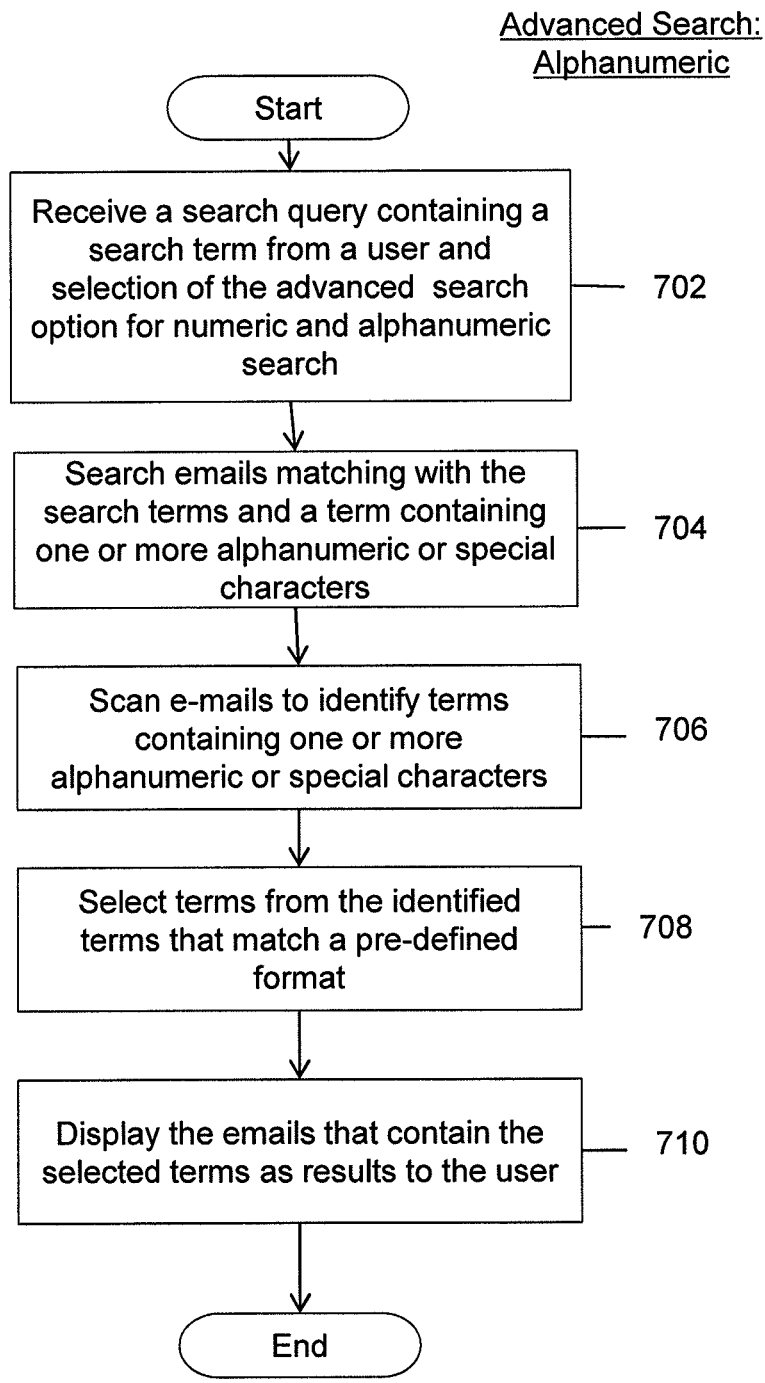
FIG. 7 is a flowchart illustrating a method for performing an advanced search for alphanumeric and special characters, in accordance with an exemplary implementation of the disclosed teachings.

FIG. 7 is a flowchart illustrating a method for performing an advanced search for alphanumeric and special characters, in accordance with an exemplary implementation of the disclosed teachings. The advanced search for alphanumeric and special characters enables the user to search for e-mails that contain alphanumeric and special characters. This search option helps the user in many ways. For example, this option can be used by the user to identify an e-mail that has a particular symbol that the user remembers as a characteristic of the e-mail. For example, the user can look for all relevant e-mails that have one or more references to "$". The user can use this for a myriad of utilities in business and personal life, such as identifying quotations given with prefix $ or payments made in US Dollars.

The process initiates when user 102 checks a check box indicating that he wants to search for alphanumeric and special characters, symbols, etc.

At 702, a search query containing one or more search terms and the selection for the advanced search option for alphanumeric and special characters is received from user 102. At 704, e-mails that match the search term(s) and contain one or more alphanumeric or special characters are searched. The alphanumeric characters may also contain numeric characters within the word which is used by the system to affirm that the term forms part of special characters and not a regular word belonging to a language. Also, an entire term that includes only numeric characters is also considered in the search. Examples of special characters include, but are not limited to, '@', '#', '$', '%', and '&'.

Further, at 706, e-mails containing terms with one or more alphanumeric or special characters are scanned. The objective is to find terms containing alphanumeric, numeric and special characters such as Fedex numbers and airplane flight PNR numbers such as "FG4ABT". Thereafter, at 708, the terms identified at 706 are checked to select terms match a pre-defined format. The pre-defined format is stored in a database of pre-defined formats and the pre-defined format is selected from the database based on the search term(s) provided by the user at 702. Subsequently, at 710, e-mails that contain the selected alphanumeric and special characters terms are displayed to the user. Also, the selected terms with alphanumeric or special characters are highlighted while presenting the e-mails to the user.

In an exemplary implementation of the disclosed teachings, if no pre-defined format is identified to be associated with the search term(s) from the database, all e-mails with terms that contain alphanumeric and special characters are displayed to the user. The user can then browse the results to identify the term which is of interest. In another embodiment, only the terms that contain alphanumeric and special characters with the matching format are displayed to the user, without displaying associated e-mails.

To further elaborate in detail, the user may check the check box corresponding to alphanumeric and special characters search, and enter a search term such as "expedia". The search term is received at 702. Based on the flow diagram described in FIGS. 3a and 3b, it is understood that the user is referring to the domain name expedia.com. After this, e-mails containing phrases with alphanumeric characters from domain expedia are searched at 704. At 706, identified e-mails are scanned to capture the terms containing alphanumeric or special characters. At 708, the format of the captured terms containing alphanumeric and special characters is checked to find a match with the format associated with domain expedia in the database. At 710, e-mails with the matching terms that contain alphanumeric and special characters are presented to the user as the result of the search. For instance, an e-mail that contains "PNR-YR2B4E" is presented to the user as the result if "PNR-YR2B4E" matches with the pre-defined format associated with domain expedia. Similarly, consider another example where the user enters "tracking number" and "expedia" as search terms. The system conducts the search considering expedia as a domain and "tracking number" as a general term. In other words, e-mails from domain expedia containing "tracking number" are identified. The identified e-mails are then scanned to identify terms with alphanumeric or special characters that match with the format of the tracking number from expedia stored in the database. For example, the system may identify a term with numeric characters, "37610345," which is contained within the e-mails from expedia.com. The system may recognize these alphanumeric and special characters through one or more variations of words/text. The one or more variations may include text containing numbers, a series of numbers, text containing multiple hyphens, text containing special characters, text without a vowel in the first five letters, or text that is all capitalized.

In an exemplary implementation of the disclosed teachings, the advanced search may be performed by the user by marking a tick in the check box provided in the interface of plug-in 106. In another exemplary implementation of the disclosed teachings, the advanced search can be performed when the user selects an option for advance search from the dropdown menu provided in the interface of plug-in 106. Further, the process may be automated by the system if so required.

Figure 8:
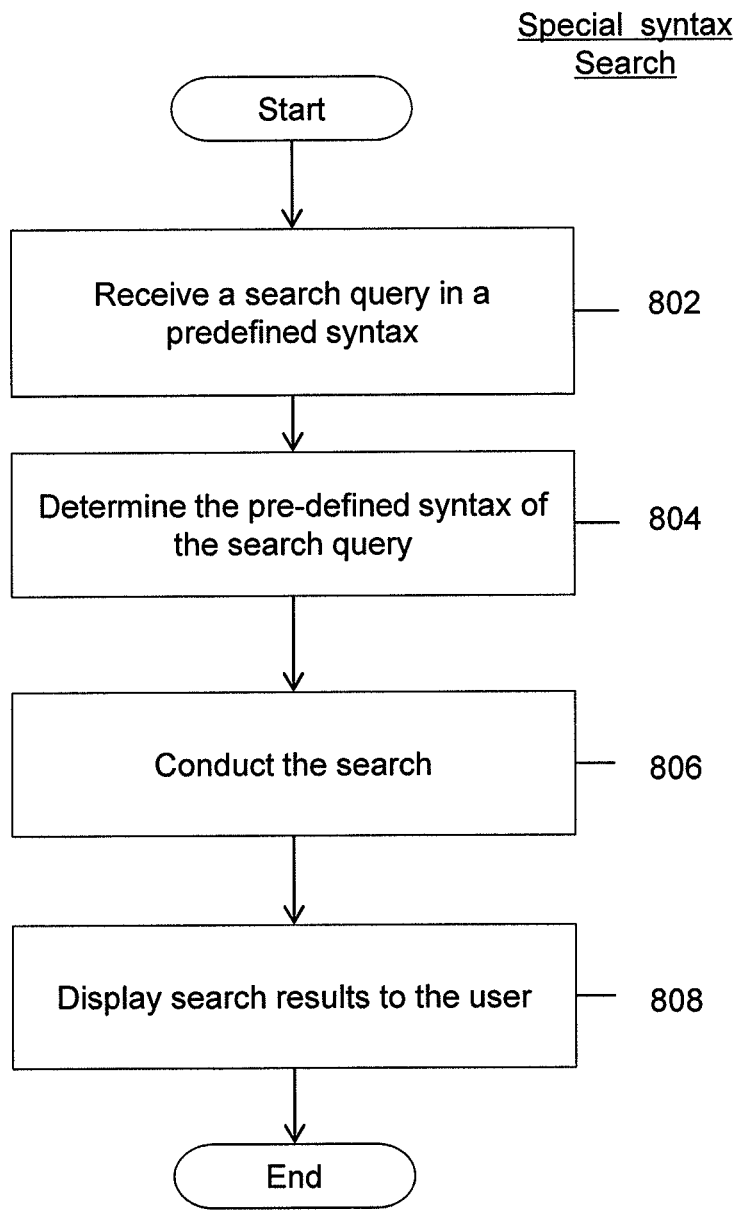
FIG. 8 is a flowchart illustrating a method for performing an advanced search corresponding to a pre-defined syntax, in accordance with an exemplary implementation of the disclosed teachings.

FIG. 8 is a flowchart illustrating a method for performing an advanced search corresponding to a pre-defined syntax, in accordance with an exemplary implementation of the disclosed teachings.

This advanced search includes searching based on a pre-defined syntax input by the user. The pre-defined syntax may be 'From Person A:-To Person B' and the like.

Today's e-mail clients providers have the ability to search for e-mails from Person A-Person B containing certain words such as "patent" and/or not containing certain words such as "methodology." Besides, the e-mail clients facilitate searching for e-mails that either have or do not have an attachment. Further, in e-mail clients such as Gmail, the user has to leave his default search box, and in e-mail clients such as Microsoft Outlook, the user has to click on a dropdown menu and individually enter Person A's name or e-mail address, Person B's name or e-mail address, and so forth. While using the e-mail clients as described above, the user is not able to use the default check box and enter the search terms in such a way that the system semantically understands the search query.

Another limitation of the existing e-mail clients is that they are not able to search for e-mails with a particular attachment type. For example, if a user wants to search for all e-mails received from Sam Spade that have an attachment type ".xls," then the user is not able to limit the search to the attachment type. Although the user can enter the term "xls" in the advanced search field of current applications such as Gmail and Outlook, the system does not semantically understand that the user is referring only for attachment types in "xls" format. The system treats this entry as a search for any text in the e-mail that contains "xls" and displays the results.

Further, the methodology considers a pre-defined list of different versions of a particular program. For example, for Microsoft Excel®, the attachment types have evolved from ".xls" to ".xlsx' based on the version of Microsoft Excel that the user who has sent the e-mail is using. While searching for e-mails and restricting the search to e-mails that have an attachment type containing a file created by Microsoft Excel®, the user may not know which version of Microsoft Excel the sender of the e-mail was using when he sent the e-mail. The disclosed teachings will also have a pre-defined list of different attachment types of popular programs (mentioned above) so that a search for an attachment type ".xls" may also return results of e-mails fitting the criterion entered. For example, the system also searches for different file types belonging to the same program such as "xls," "xlsx," "doc," and "docx."

A further limitation of advanced search today is that the user has to specify a person or e-mail address in the "From: and the To:" sections when the user wishes to view e-mail received from a particular person or e-mail sent to a particular person. However, the current advanced search does not enable the user to see all the e-mails exchanged between the user (e.g., Sam) and Tim. The present advanced search limits the user to searching for e-mails from Sam to Tim or from Tim to Sam, but very often the user may want to see the entire exchange of mails between Sam and Tim, that is emails from Sam to Tim and from Tim to Sam. The disclosed teachings overcomes this limitation of the existing e-mail clients.

In addition to overcoming the above-mentioned limitations, the system according to the disclosed teachings allows for advanced search without requiring a separate box for the same. Advanced searches can be performed through the same search box which is used by the user to perform regular searches. This greatly contributes to convenience and saves precious user time.

At 802, a search query in a pre-defined syntax is received from user 102. The pre-defined syntax can be input by the user in a text box provided by plug-in 106. The pre-defined syntax can be, but is not limited to, "From Person A:-To Person B," ".", ".doc," attachment name and attachment type, person names, "received from person A after a date", sent to person A before a date", and the like. A list of the predefined syntaxes is stored in plug-in 106 and can be viewed by the user.

On receiving the search query in the pre-defined syntax, at 804, the system determines the predefined syntax of the search query. For example, when user inputs "from Vinay:-to Pavan", the system understands that the user is looking for e-mails that have been sent by a person "Vinay" to a person "Pavan", because the process explained in FIGS. 3a and 3b identifies Vinay and Pavan as two persons and the syntax of the user's input matches with the pre-defined syntax "from person A:-to Person B". Subsequently, at 806, the system searches for e-mails matching the user's requirements. Thereafter, at 808, search results are displayed to the user.

Further, the pre-defined syntax "." refers to e-mails containing all kind of attachments. Additionally, the pre-defined syntax ".doc," corresponds to e-mails with a particular kind of attachment, i.e., ".doc." So in this embodiment, the system semantically understands that the user is looking for e-mails that have an attachment and the attachment has the file type ".doc." Further, as mentioned above, the system will also consider variations of the file type ".doc," such as ".docx."

Figure 9:
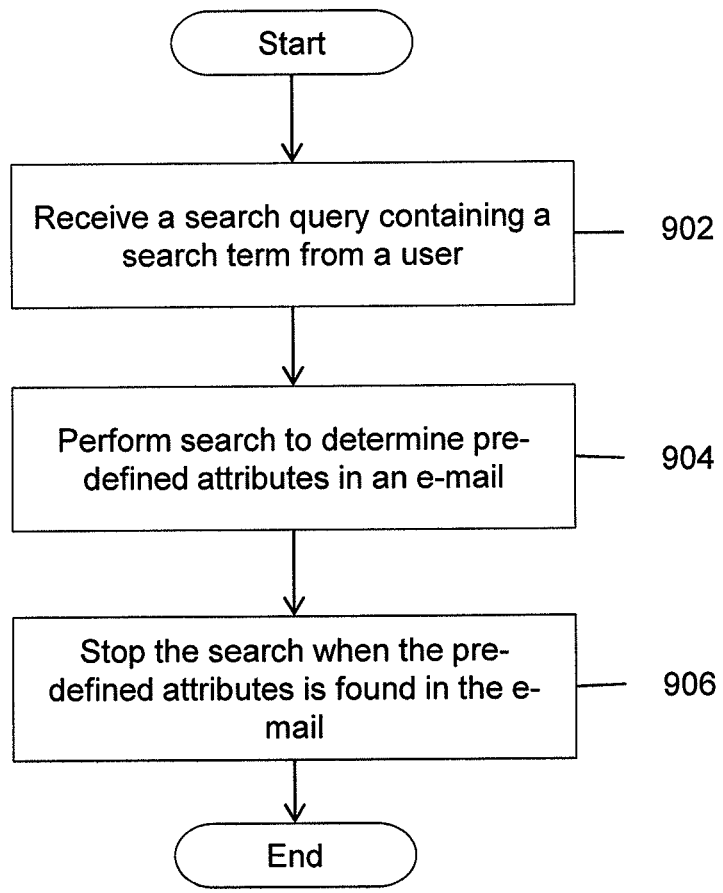
FIG. 9 is a flowchart illustrating a method for stopping a search in an e-mail, in accordance with an exemplary implementation of the disclosed teachings.

FIG. 9 is a flowchart illustrating a method for stopping a search in an e-mail, in accordance with an exemplary implementation of the disclosed teachings.

Stopping a search in an e-mail is a process to stop the search in an e-mail in order to avoid multiple entries or occurrences of an e-mail in the search results. Today, e-mail clients such as Gmail and Microsoft Outlook append the original mail when the user sends a reply e-mail. Further, when the user searches for a term, the e-mail client treats the appended mail as contiguous or the same as the current e-mail. This creates duplicate results in the search and is an inefficient method of search.

This can be understood with the help of an example. It can be assumed that user Tim sends a mail to user Sam containing the text:

"Hi Sam. We are going ahead and filing the provisional patent at the USPTO."

Further, user Sam replies to user Tim, where the e-mail contains the text:

"Hi Tim, Great to hear from you. This is wonderful news."

Thereafter, user Tim replies to user Sam, where his e-mail contains the text: "Thanks Sam. Will keep you posted."

As a common practice among users, the reply e-mails have the earlier e-mails appended. Now when a user enters search term "patent", the system searches for "patent" in the e-mails by treating the appended e-mails and the current e-mail as one and the same. As a result, the system will display three sets of results instead of displaying only one result.

This is inefficient and 'clogs' the search results as it would be more efficient for the system to show only the first mail from user Tim to Sam, which contains the word "patent," and ignore the other e-mails, which do not contain the search term "patent." Today's search technology is not able to or does not distinguish between the appended original mail and the reply.

In order to overcome the shortcoming of the current e-mail clients, the disclosed teachings proposes a method to identify a set of pre-defined characteristics that will identify where a particular e-mail has ended and where the appended e-mail has started. In an embodiment of the program, the system is able to distinguish between such e-mails in order to give more pertinent results.

At 902, a search query containing one or more search terms is received from user 102. Thereafter, at 904, a search is performed to determine pre-defined attributes in an e-mail. The pre-defined attributes in the e-mail indicate the end of an e-mail. For example, it could be the text described below, found within the body of an e-mail. The system looks for 'markers' which indicate the end of the mail such as the series of text such as the following:

"From: XXXXXXX [mailto:xxxxxxxx xxxxx.xxx]
Sent: Sunday, June XX 2010 6:52 PM
To: xxxxxxxxx@xxxx.xx
Subject: ABC"

The series of mails within the body of a single e-mail could look like this:

Respected Sir,
I have deposited the money to the account mentioned below.
Regards,
Arijit
From: Vinay Bawri [mailto:vinaybawri@gmail.com]
Sent: Sunday, Jun. 6, 2010 6:52 PM
To: laxminarayan.sharma@calcom.co.in; arijit.banerjee@vinaycements.com
Subject: Deposit
Dear Laxmi,
Please have $10,000 deposited to the following account.
Account Number: XXXXXX
Branch, Bank: ABC, XYZ
Regards,
Vinay Once the pre-defined attributes are determined or found in the e-mail, the search at 906 is stopped to reduce duplication in search results.

To further elaborate with the help of above-given example e-mail series, it can be assumed that the search term received from the user is "$10,000." After receiving the search term, a check is performed to identify if "$10,000" is found anywhere in e-mails. During the search, the system checks the above-given e-mail series. The system starts the check in the e-mail series by checking the e-mail sent by Arijit. The system does not identify the search term $10,000 in the e-mail by Arijit. After checking in the content of Arijit's reply, the system keeps searching and identifies the pre-defined markers that indicate the end of the e-mail. The system then stops the search in this e-mail series. As a result, this e-mail series does not form part of the search results. Similarly, the system checks other e-mails in the mailbox and identifies a match for $10,000 in the e-mail by Vinay. In the existing solutions for e-mail searching, the entire content of an e-mail-series is considered for searching. Hence, these solutions will also identify the e-mail series starting with Arijit's e-mail as a search result. Hence, search term "$10,000" present in Vinay's e-mail produces two entries in the search results identified by these solutions—1) e-mail series starting with Arijit's e-mail, and 2) Vinay's e-mail. The identification of the end of an e-mail ensures that each e-mail in a series is treated separately for search. Accordingly, only those e-mails/e-mail series which have the matching term in the subject or the body of the latest e-mail are included in the search results. Thus, duplicate entries are not displayed in the search results. Moreover, this criterion of searching only a part of the e-mail and not the entire e-mail makes the system efficient.

Figure 10:
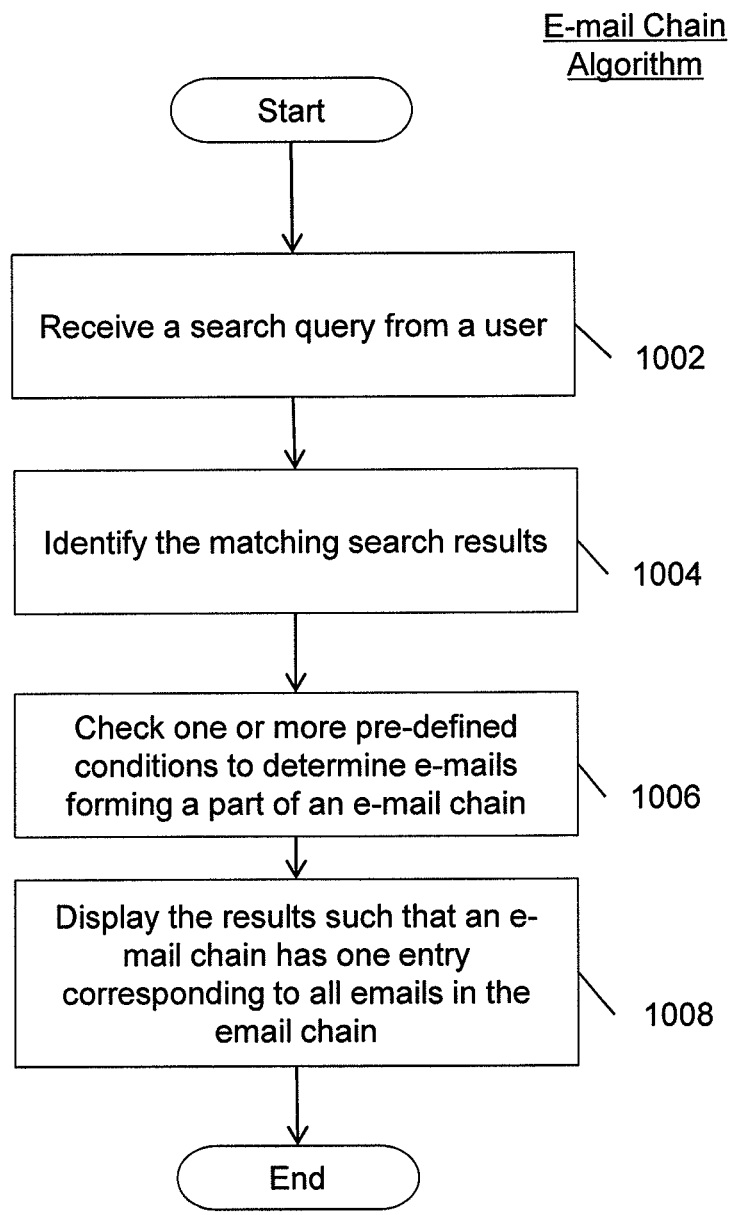
FIG. 10 is a flowchart illustrating a method for determining an e-mail chain, in accordance with an exemplary implementation of the disclosed teachings.

FIG. 10 is a flowchart illustrating a method for determining an e-mail chain, in accordance with an exemplary implementation of the disclosed teachings.

The system identifies an e-mail-chain for better presentation of the search results. The e-mail that are identified as a part of a chain are clubbed together and presented as an e-mail chain rather than separate e-mails in the search results. This helps the user in navigating easily through the search results. For example, consider that a user's mailbox has many a weekly report e-mails titled "expenses on raw material" along with other e-mails in which expenses have been discussed. The user wants to search for a particular e-mail related to expenses discussion, which is different from the e-mails containing the weekly report. When the user searches using "expenses" as an example, the search will return all e-mails discussed above, i.e., e-mails containing the weekly reports and the e-mails in which expenses have been discussed. If all e-mails are listed separately, the user will need to browse through all e-mails to identify the e-mail in which he is interested. On the other hand, if the e-mails with weekly reports are clubbed together as an e-mail chain, the user will browse through the e-mail chain only once to identify that all e-mails in that chain are not of interest. On the other hand, if the user is looking for a specific weekly report, the user will need to select the e-mail chain and all e-mails in the chain will be presented in an order. Again the orderly presentation of e-mails in an e-mail chain is easier to navigate instead of looking at each weekly report e-mail separately in a list of e-mails in which with other expenses e-mails are displayed between weekly report e-mails. The user would also quickly be able to go to the particular e-mail which is of the date which he is looking for, for example expense report dated 10.1.2011

Referring to FIG. 10, at 1002, a search query is received from user 102. At 1004, a search is conducted to identify matching e-mails. At 1006, the e-mails are scanned to check whether one or more pre-defined conditions are checked. The one or more pre-defined conditions may correspond to similar attributes such as e-mails have same kind of attachments with a particular attachment type for example, ".doc" or does not have any attachment as the case may be; e-mails have come from the same sender; 70% of the recipients of the e-mails are the same; the first three words of the subject line are the same; and the like. Such one or more pre-defined conditions facilitate the determination of the e-mails that are part of an e-mail chain. Once the one or more pre-defined conditions are checked, the e-mails with similar characteristics are clubbed together and it is concluded that these e-mails constitute a part of an e-mail chain. Subsequently, at 1008, the search results are ranked and presented to the user such that an e-mail chain has only one entry in the presented results. The e-mail chain entry is of the latest e-mail in the e-mail chain. Also, a sign to represent an e-mail chain is displayed to the user corresponding to the e-mail chain. If the user selects an e-mail chain, all e-mails in the e-mail chain are displayed.

The invention embodied is different from the "thread" concept employed by e-mail providers such as Google Mail (Gmail). The thread concept requires that the entire subject line of multiple e-mails, after ignoring 'Re:', 'Fwd:,' etc., to be identical. For example, e-mails with subject lines as described below are grouped as one:

Sub: "Requirement for threading"
Sub: "Re: Requirement for threading"
Sub: "Fwd: Requirement for threading"

Although the system mentioned above captures replies and forwards to the original e-mail very effectively, the system is not able to locate a chain of e-mails, which a user would be able to identify manually. However, the system of the disclosed teachings is able to identify the e-mail chain. The chain of e-mails is identified based on similar traits in the e-mails, for example: e-mails with the same kind of attachments, for example, ".doc"; same sender of the e-mails; 70% of the recipients of the e-mails are the same; the first three words of the subject lines are the same; and the like. For example, the disclosed teachings treats e-mails with subject lines as described below as an e-mail chain:

E-mail 1
From: Vinay Bawri
To: Mala Bawri, Sam Spade, Winston Churchill
Subject: Report as of 10.1.10
Attachment type ".xls"
E-mail 2
From: Vinay Bawri
To: Mala Bawri, Sam Spade
Subject: Report as of 11.1.10
Attachment type ".xls"

The above two e-mails are treated as part of the e-mail chain, because both the e-mails have the subject line similar in nature, and also, the sender of both the e-mails is the same and the attachment type is the same.

In another exemplary implementation of the disclosed teachings, e-mails received over a pre-defined period of time are also treated as part of the e-mail chain. The pre-defined period of time may be a week, a month, two months, and the like. For example, e-mails with the subject "account statement" received every month are treated as part of an e-mail chain. As described above, Gmail is unable to determine e-mail chain because a pre-condition for Gmail to determine an e-mail chain is that after removing the prefixes of "Fwd:" and "Re:" the subject line of the mails in an e-mail chain must be identical.

Figure 11:
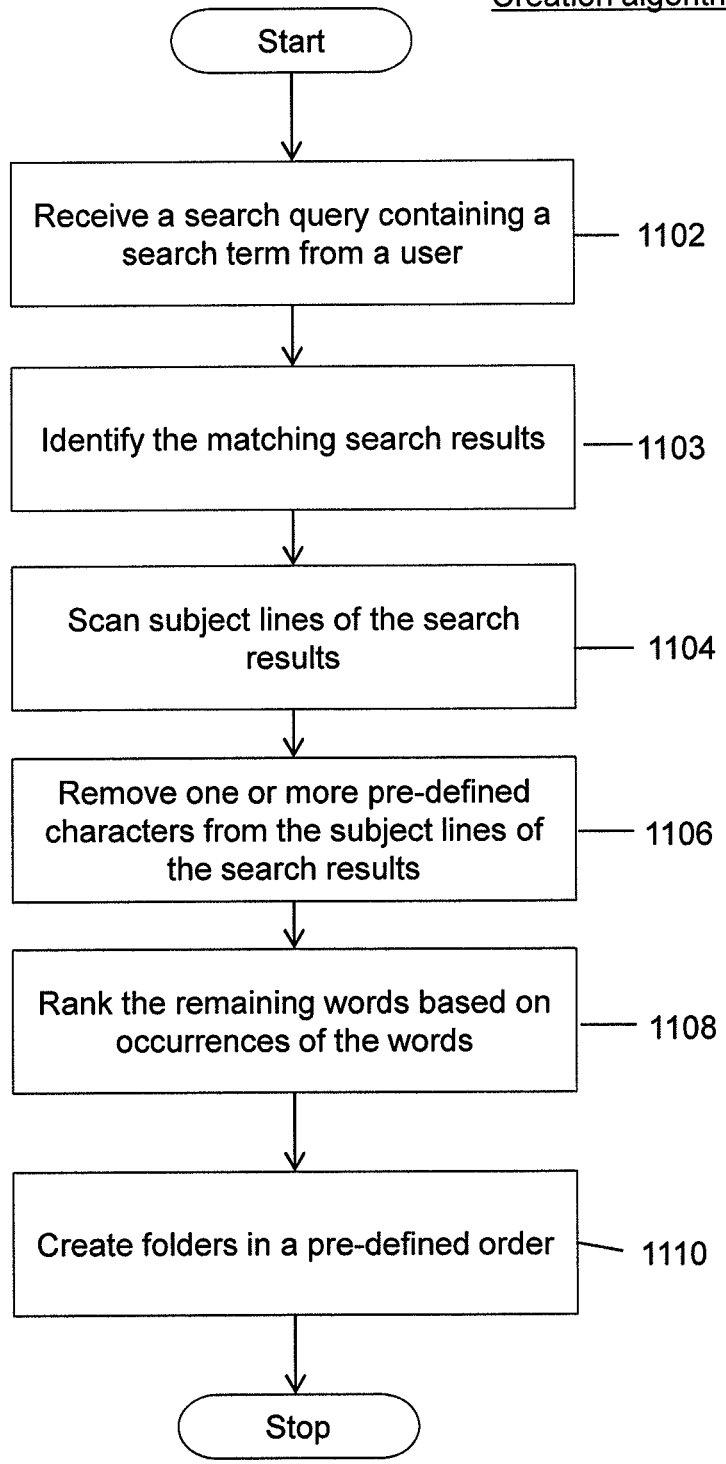
FIG. 11 is a flowchart illustrating a method for presenting search results to a user by creating one or more automatic folders, in accordance with an exemplary implementation of the disclosed teachings.

FIG. 11 is a flowchart illustrating a method for presenting search results to a user by creating one or more automatic folders, in accordance with an exemplary implementation of the disclosed teachings.

At 1102, a search is conducted based on a one or more search terms is received from user 102 to identify search results. At 1103, a search is conducted to identify results. At 1104, subject lines of the resulting e-mails are scanned. At 1106, one or more pre-defined characters, such as conjunctions/articles, are removed from the subject lines of search results. Subsequently, at 1108, the remaining words present in the subject lines of the search results are ranked based on the number of occurrences of the words. At 1110, folders are created in a pre-defined order in the user's mailbox based on the occurrences of words identified at 1108. The pre-defined order can be based on the ranking of the words and the number of repetitions of a word. In accordance with an exemplary implementation of the disclosed teachings, the folders may be created date-wise or any other 'filter' that may be necessary can be applied to the created folders. At the end, the resulting e-mails may be transferred to the folders created if necessary. When the search results are presented to the user, the folders are also presented. When the user selects any of the presented folders, the search results corresponding to the folder are presented to the user. The search results corresponding to the selection are a subset of the search results identified at 1102 which include the words in the subject corresponding to the folder.

To further elaborate with the help of an example, the system creates automatic folders for presenting the search results. First, the subject lines of e-mails are scanned. For example, the subject line of an e-mail such as, "patent research and patent drafting," is scanned. After scanning, articles such as "and" are removed from the subject line. In another example, the subject line of an e-mail containing "Enclosed is prior art search for patents from a research firm and reports of search from a legal firm" is scanned. Conjunctions/Articles such as "and", "from", "is", "a" are removed from the subject line of this e-mail. After this, it is determined that the words "search" and "firm" have occurred twice each, whereas the words "drafting" and "research" have occurred once each. Accordingly, words "search" and "firm" are ranked higher, whereas "drafting" and "research" are ranked lower. In light of this, folders "patent search," "patent firm," "patent drafting," "patent research," and the like are created automatically. In other words, the folders are ranked based on number of occurrences of their respective words.

The process above might involve creation of a number of folders if a user has even a fairly pre-defined-sized mailbox, for example, a mailbox with 5,000-10,000 e-mails in it. The number of folders will thus get unwieldy and the purpose of organizing the information may be lost. Therefore, in order to organize the folders in a meaningful manner, it has been envisioned that the folders created in the process above be divided into those which are folders created by the algorithm described above and those which are folders created due to the 'threading' concept. As described above, a thread is a process where a user sends an e-mail and an e-mail with the same subject is sent in reply by the recipient, to which the sender may send a reply.

A thread is very effective in understanding the context of a reply to an e-mail. Accordingly, the folders envisioned are such that they may contain the same keyword such as "patent," but with different subject lines such as "patent research technology" and "filing of patent at the USPTO."

The folders are further divided into sub-categories, where one category includes e-mails containing keywords such as "patent" and another category includes e-mails as described in FIG. 11.

In one exemplary implementation of the disclosed teachings, the folders can be created for a specific time period as decided by the user. For example, in order to keep the folders and information updated, the user may want the system to automatically create folders for e-mails for a pre-defined time period, such as "past 6 months" or "past one year." Further, the user may want to create folders for e-mails corresponding to a particular domain such as a preferred client's company's domain name or a particular e-mail account of the user such as vinaybawri@yahoo.com. Further, the user may also want to create folders for his/her important contacts or manually choose the contacts for which he/she wants to create the folders. It is understood that the invention is not limited to the embodiments described above.

Further, to optimize the process or to improve the relevance or reduce the number of folders, pre-defined steps can be implemented for a folder containing the minimum number of e-mails. For example, the folders containing fewer than five e-mails may be ignored or hidden by the system. In order to arrive at the optimum number, the system may use a mathematical model to find the average, the median or mode of the number of e-mails contained in each folder, and arrive at the criterion for the minimum number of e-mails that a folder should have in order to be created or to be displayed. In another embodiment, folders can be created corresponding to words which occur in the subject lines for more than a minimum number of times.

The above examples are given as illustrations to show how folders can be created automatically. Further, the folders themselves can be organized so that the e-mails are organized based on their context. The application of this technique is not restricted to the examples given above.

Further, the process above facilitates creation of an index. The index can be created alphabetically. In accordance with another embodiment, the index can be created as a list of words associated with each user. The index can be maintained alphabetically by contacts of the user as well as arranged in any format and combination which suits the user. For example, all words which are common to contacts may be found and connections between the contacts are established.

Figure 12:
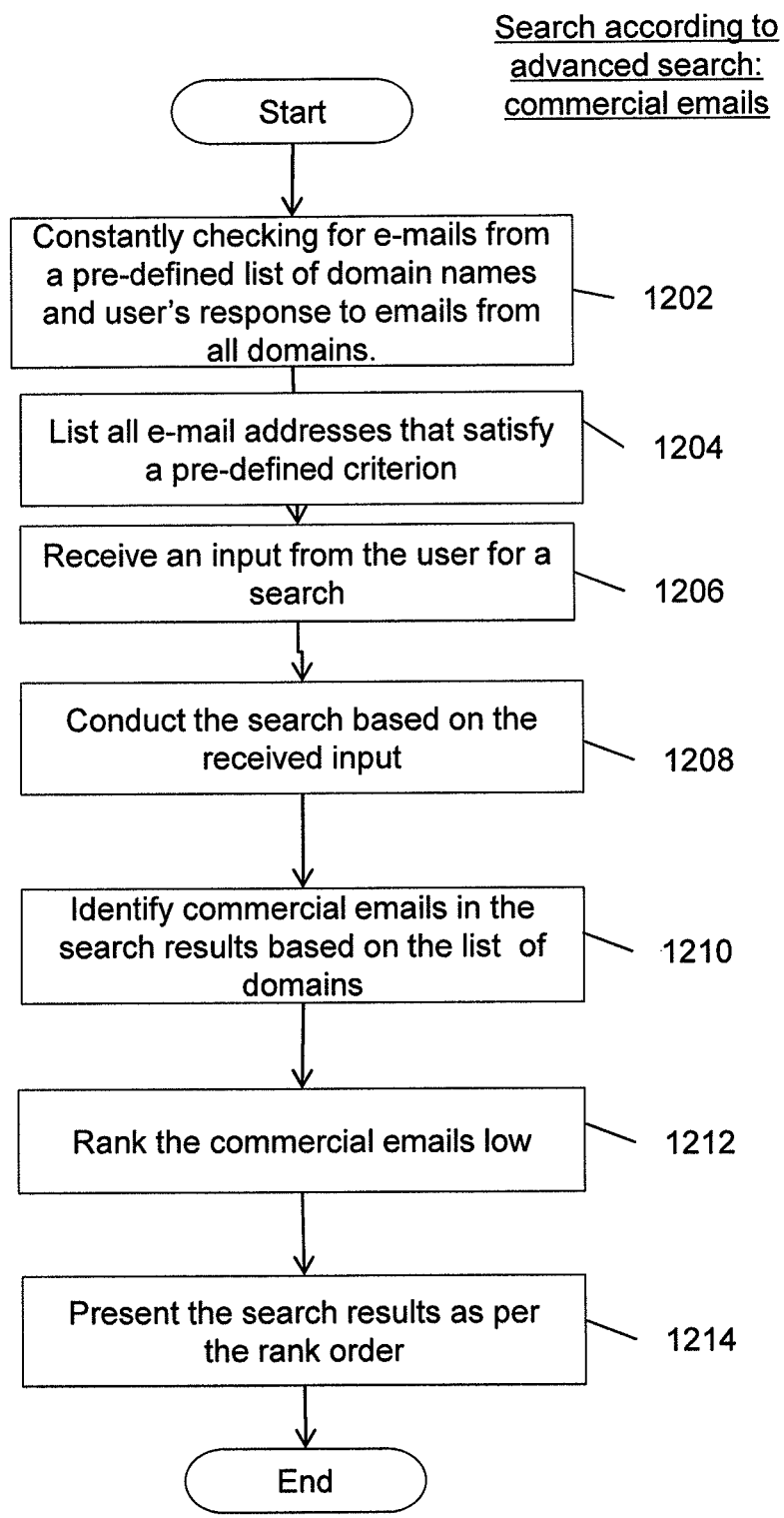
FIG. 12 is a flowchart illustrating a method for identifying commercial e-mails, in accordance with an exemplary implementation of the disclosed teachings.

FIG. 12 is a flowchart illustrating a method for identifying commercial e-mails, in accordance with an exemplary implementation of the disclosed teachings. The identification of commercial e-mails helps the system in two ways. Firstly, the e-mails that are identified as commercial e-mails are ranked lower than the non-commercial e-mails, while presenting the results of a search. Secondly, the system enables the user to conduct a search in commercial e-mails only. At 1202, the system constantly checks for e-mails from a pre-defined list of domain names and for the user's response to e-mails from all domains. The pre-defined list of domain names is a list containing popular commercial websites or domain names on the Internet such as alibaba.com, amazon.com, and ebay.com. A comprehensive list of e-mail service providers around the world is maintained and this list is removed from the pre-defined list. The pre-defined list of domain names is maintained so that non-commercial e-mails, such as the websites of e-mail providers are not confused with commercial websites. If this step is not taken then websites and user e-mails from websites like gmail.com or vinay@gmail.com will be confused with sites like ebay.com.

Further, this list of popular websites can be obtained from a pre-defined website such as http://www.seobook.com/download-alexa-top-1-000-000-websites-free and the like. Also, the user is given access to the list in order to include or exclude any website form the list.

At 1204, the system identifies e-mail addresses as commercial based on pre-defined conditions. The pre-defined conditions include e-mails that have been sent from the domains listed in the pre-defined list of domain names. Also, the pre-defined conditions include user's response criterion such as, but is not limited to, "received e-mail has never been replied to", "an e-mail has never been composed to addresses of the received e-mail," and "a sender of an e-mail has never sent an e-mail to the user with a CC (Carbon Copy) to the said e-mail address". For example, for e-mail address ORDERS@AMAZON.COM, the user may have never replied to mails from this e-mail address, never composed a new mail to ORDERS@AMAZON.COM, and e-mail address ORDERS@AMAZON.COM has never been in the CC of any mail which the user has replied or composed.

At 1206, an input is received from user 102, for conducting a search. The user inputs one or more search terms. Also, the user may check the advanced search option for conducting the search in commercial e-mails only. At 1208, the system conducts a search based on the received input to identify search results using the methods as described in FIGS. 3a, 3b, 5, 6, 7, 8, 9, and 10. At 1210, the system identifies commercial e-mails in the search results using the list of e-mail addresses identified at 1204. In other words, all e-mails sent from the domains listed in the pre-defined list of domain names and e-mails sent from e-mail addresses satisfying the pre-defined user response criteria as mention at 1204 are identified as commercial e-mails. At 1212, the system ranks the commercial e-mails low as earlier mentioned with reference to FIG. 4. At 1214, the search results are then presented to the user as per the rank order. In case the user has checked the option of searching in commercial e-mails only, only the commercial-e-mails identified in the search results at 1210 are presented to the user.

Figure 13:
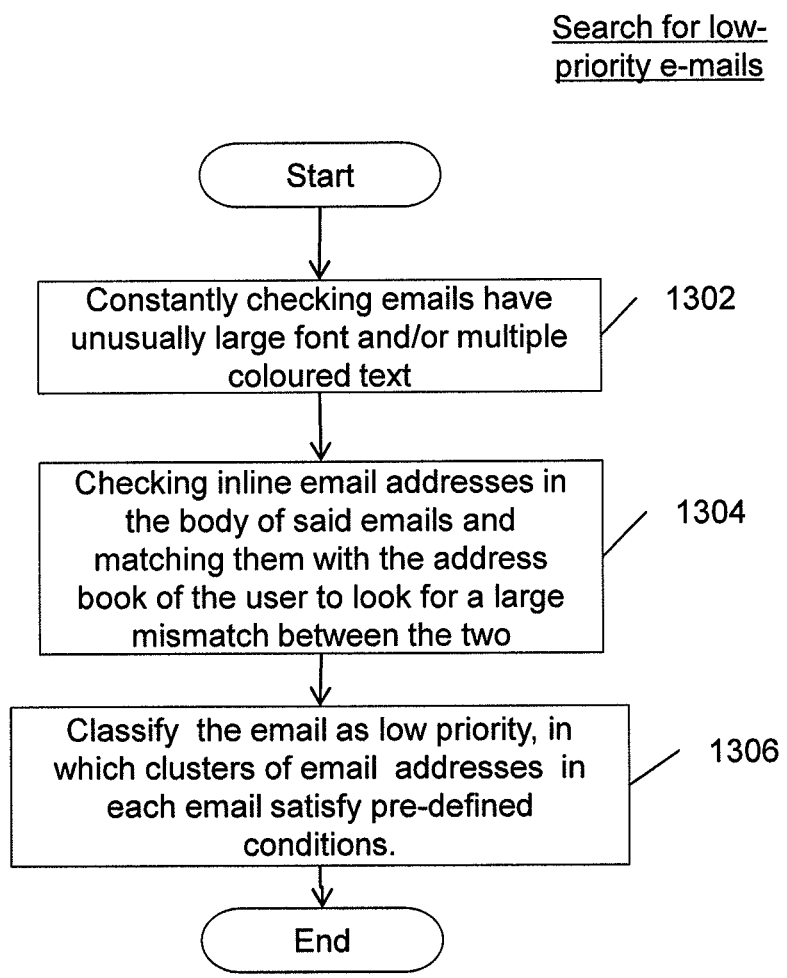
FIG. 13 is a flowchart illustrating a method for identifying low-priority e-mails, in accordance with an exemplary implementation of the disclosed teachings.

The system also enables identification of low-priority e-mails for ranking search results as mentioned in FIG. 4. FIG. 13 is a flowchart illustrating a method for identifying low-priority e-mails, in accordance to an exemplary implementation of the disclosed teachings. At 1302, the system constantly checks for e-mails that have a large font and/or text in multiple colors. The system identifies a large font by comparing the text with a pre-defined font size stored in the system. For each of e-mail identified at 1304, the system identifies e-mail addresses mentioned in the e-mail and matches them against the e-mail addresses present in the address book of the user to look for a large mismatch between the two. At 1306, the system classifies e-mails that satisfy pre-defined criteria as 'low-priority' e-mails. The pre-defined criteria are as follows:

---

From: Payal Mohanka <payalmohanka@gmail.com>
Date: June 16, 2011 3:27:50 PM GMT+05:30
To: Memi Miglani <memimiglani@gmail.com>, joysina chawla <joycina42@yahoo.co.in>, Nisha Singh <nisharisingh@gmail.com>, Mala Bawri <mabawri@gmail.com>, Lovey Kappur <loveykappur@gmail.com>, "\"PUJA KAPPUR\" m" <p2kappur@kookiejarindia.com>, Mrinall Mohanka <mrinallmohanka@gmail.com>, meghna mohanka <amazingmeg@hotmail.com>
Subject: Fwd: 10 classic Indianisms
---------- Forwarded message ----------

-continued

From: Viba Mitra <vibamitra@gmail.com>
Date: Thu, Jun 16, 2011 at 2:43 PM
Subject: 10 classic Indianisms
To:
10 classic Indianisms: 'Doing the needful' and more
How to fix grammatically insane phrases found in common Indian English
By Daniel DMello 13 June, 2011

In the example mentioned above, if a majority of the email recipients are not a part of the address book of the user, the above email will be classified as a low-priority e-mail.

The method and system described above have numerous advantages. The disclosed teachings facilitates searching in a mailbox based on pre-defined algorithms to retrieve and rank results that are more relevant to a user. While searching, one or more pre-defined algorithms are taken into account in order to provide better and accurate results to the user. Further, the invention is able to capture the essence of a search term input by a user by semantically understanding whether the user is referring to a person, a domain name, an attachment or an attachment type, an e-mail address, or a general search term. Further, the disclosed teachings facilitates searching within attachments and ranking the attachments based on the search term(s) in order to extract meaningful information. Further, the disclosed teachings facilitates automatic creation of one or more folders and indexes. Moreover, the disclosed teachings facilitates identification of commercial e-mails based on a pre-defined criterion. Further the disclosed teachings facilitates searching for special character text, logins and passwords and the like. In addition to the above, the invention describes a plug-in or an add-on, which can be integrated into any mailbox which resides on, but not limited to, a computer, a webserver, or a mobile device, for implementing various aspects of the disclosed teachings described above.

The system, as described in the disclosed teachings or any of its components, may be embodied in the form of a computer system. Typical examples of a computer system include a general-purpose computer, a PDA, a cell phone, a programmed microprocessor, a micro-controller, a peripheral integrated circuit element, and other devices or arrangements of devices that are capable of implementing the steps that constitute the method of the disclosed teachings.

In a computer system comprising a general-purpose computer, such may include an input device, and a display unit. Specifically, the computer may comprise a microprocessor, where the microprocessor is connected to a communication bus. The computer may also include a memory—the memory may include Random Access Memory (RAM) and Read Only Memory (ROM). The computer system further comprises a storage device—it can be a hard disk drive or a removable storage drive such as a floppy disk drive, optical disk drive, and the like. The storage device can also comprise other, similar means for loading computer programs or other instructions into the computer system.

The computer system may comprise a communication device to communicate with a remote computer through a network. The communication device can be a wireless communication port, a data cable connecting the computer system with the network, and the like. The network can be a Local Area Network (LAN) or a Wide Area Network (WAN) such as the Internet and the like. The remote computer that is connected to the network can be a general-purpose computer, a server, a PDA, and the like. Further, the computer system can access information from the remote computer through the network.

The computer system executes a set of instructions that are stored in one or more storage elements in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the disclosed teachings. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The software program or programs may be provided as a computer program product, such as in the form of a computer readable medium with the program or programs containing the set of instructions embodied therein. The processing of input data by the processing machine may be in response to user commands or in response to the results of previous processing or in response to a request made by another processing machine.

While the preferred embodiments of the invention have been illustrated and described, it will be clear that the invention is not limited to these embodiments only. Numerous modifications, changes, variations, substitutions, and equivalents will be apparent to those skilled in the art without departing from the spirit and scope of the invention as described herein.

What is claimed is:

1. A processor-implemented method for searching a mailbox of a user device to identify and present one or more results relevant to the user's requirements, the mailbox comprising a plurality of e-mails, the method comprising:
   receiving at the user device, an input from the user specifying the user's requirements;
   identifying at least one context of a search based on the input;
   searching in the mailbox according to the at least one context to identify one or more results relevant to the input, the results being at least one of one or more e-mails and one or more e-mail attachments;
   ranking each of the results according to the extent of relevance to the received input, wherein the ranking is performed based on a plurality of pre-defined conditions; and
   presenting the results to the user according to the ranking.

2. The processor-implemented method of claim 1, wherein the input comprises at least one search term.

3. The processor-implemented method of claim 2, wherein the input further includes an advanced search option, the advanced search option being selected from a plurality of pre-defined advanced search options.

4. The processor-implemented method of claim 3, wherein the advanced search option is a log-in passwords search.

5. The processor-implemented method of claim 4, wherein the advanced search option of the log-in passwords search is selected using a sub-process comprising:
   receiving at the user device a first pre-define phrase from the user, the pre-defined phrase being a user identity (User ID);
   identifying one or more e-mails in the user device in which the first pre-defined phrase appears;
   scanning by the user device to find the text within a pre-defined limit of the first pre-defined phrase in each of the identified one or more e-mails to determine one or more combinations of a second pre-defined phrase, the second predefined phrase being at least one of a password, pin and pin number; and presenting the e-mail comprising the combination of the first pre-defined phrase and second predefined phrase to the user, the email being presented at a display in the user device.

6. The processor-implemented method of claim 3, wherein the advanced search option is an alpha-numeric and special characters search.

7. The processor-implemented method of claim 6, wherein the advanced search option of the alpha numeric and special characters search is selected using a sub-process comprising:
   searching in the mailbox according to the identified context to identify one or more results relevant to the received input and comprising at least one of alpha-numeric, numeric and special characters;
   scanning the identified results to identify at least one of the numeric, alphanumeric and special character; and
   presenting the e-mails with at least one of the alphanumeric, numeric and special character to the user, the email being presented at a display in the user device.

8. The processor-implemented method of claim 3, wherein the advanced search option is a search in commercial e-mails.

9. The processor-implemented method of claim 8, wherein the advanced search option of the search in commercial emails is selected using a sub-process comprising:
   checking for each e-mail in the user device if a domain name of the e-mail is present in a pre-defined list of commercial domains, and
   checking each e-mail if the e-mail satisfies at least one criterion of the user's response "received e-mail has never been replied to", "an e-mail has never been composed to addresses of the received e-mail," and "a sender of an e-mail has never sent an e-mail to the user with a CC (Carbon Copy) to the said e-mail address".

10. The processor-implemented method of claim 2, wherein the at least one search term is received in a pre-defined syntax.

11. The processor-implemented method of claim 10, wherein the pre-defined syntax comprises one of from person A to person B, from person A with an attachment file type, an attachment file type, an attachment name with an attachment file type and an attachment.

12. The processor-implemented method of claim 10, wherein identifying the context of the search is performed using a sub-process comprising:
   identifying the context as at least one of searching for an attachment, searching for an attachment with an attachment type, and searching for an attachment name with an attachment type, according to the syntax of the received at least one search term;
   identifying the context as searching for a domain when the at least one search term matches with a domain name in at least one of a pre-defined list of domain names and plurality of e-mails in the mailbox;
   identifying the context as searching for a person when the at least one search term matches with a contact in at least one of a pre-defined contacts list in an address book and the plurality of e-mails in the mailbox;
   identifying the context as searching for a general term when the none of the contexts searching for an attachment, searching for an attachment with an attachment type, searching for an attachment name with an attachment type, searching for a person and searching for a domain is identified; and
   identifying the context according to an advanced search option from a plurality of pre-defined advanced search options by the user when the advanced search option is selected by the user,
   wherein each of the identifying steps are performed in the user device.

13. The processor-implemented method of claim 12, wherein the identified attachments are ranked based on at least one of font size, capitalization, boldening effect, color scheme, italicization, or underlining effect of the at least one search term with respect to the average format of the text in the attachment.

14. The processor-implemented method of claim 13, wherein presenting the results comprises presenting the content of attachments according to the rank.

15. The processor-implemented method of claim 13, wherein presenting the results comprises listing the attachments according to the rank.

16. The processor-implemented method of claim 1, wherein searching comprises searching in an e-mail body not including appended earlier e-mails, wherein the end of the e-mail body is identified by using a plurality of pre-defined attributes.

17. The processor-implemented method of claim 1, wherein ranking the identified results based on a plurality of pre-defined conditions is performed using a sub-process comprising:
   providing by the processor hierarchy levels to the identified at least one result based on the context through which the result is identified;
   providing by the processor hierarchy levels to the identified at least one result in which at least one search term appears in the subject line, wherein the at least one result is an e-mail;
   providing by the processor hierarchy levels to the identified at least one result in which at least one search term appears in a pre-determined range of characters in a body of the at least one result, wherein the at least one result is an e-mail;
   providing by the processor hierarchy levels to the identified at least one result in which at least one search term appears in the body other than the subject line, the pre-determined range of characters, attachment name and attachment, wherein the at least one result is an e-mail;
   providing by the processor hierarchy levels to the identified at least one result in which at least one search term appears in a pre-defined format within the content of the attachment;
   providing by the processor hierarchy levels to the identified at least one result wherein the at least one result is a commercial e-mail;
   providing by the processor hierarchy levels to the identified at least one result wherein the at least one result is a low-priority e-mail;
   providing by the processor hierarchy levels to the identified at least one result based on the date of the at least one result; and
   ranking the e-mails based on the provided hierarchy levels.

18. The processor-implemented method of claim 17, wherein providing hierarchy levels to the identified at least one result wherein the result is an e-mail, comprises designating each e-mail in the results as a commercial e-mail by a sub-process comprising:
   checking by the processor if the domain of the e-mail matches with domains in a pre-defined list of commercial domains; and checking by the processor if the e-mail satisfies at least one criterion of user's response "received e-mail has never been replied to", "an e-mail has never been composed to addresses of the received e-mail," and "a sender of an e-mail has never sent an e-mail to the user with a CC (Carbon Copy) to the said e-mail address".

19. The processor-implemented method of claim 17, wherein providing hierarchy levels to the identified at least one result comprises designating each e-mail in the results as a low-priority e-mail if the e-mail has at least one of font size larger than a predefined font size and text in multiple colors, and if the e-mail is addressed to multiple clusters of e-mail addresses and each cluster has more than a pre-defined number of e-mail addresses such that a pre-defined percentage of e-mail addresses in the cluster are not present in the user's address book.

20. The processor-implemented method of claim 17, wherein presenting the results comprises highlighting the at least one search term.

21. The processor-implemented method of claim 1, wherein presenting the results comprises presenting a plurality of terms adjacent to the at least one search term in the results, such that the terms other than conjunctions are presented, such that terms that occur more than a pre-defined minimum number in the results are presented.

22. The processor-implemented method of claim 21, wherein presenting the results further comprises:
receiving a selection of one of the presented adjacent terms by the processor, the selection being made by the user; and
presenting a sub-set of results in which the selected term occurs adjacent to the at least one search term.

23. The processor-implemented method of claim 1, wherein presenting the results comprises:
identifying e-mails in the results that satisfy one or more pre-defined conditions to determine e-mails forming a part of an e-mail chain by the processor;
presenting a latest e-mail in the e-mail chain representing the e-mail chain while presenting the results to the user; and
presenting all e-mails of the e-mail chain when the user selects to see all e-mails in the e-mail chain.

24. The processor-implemented method of claim 1, wherein presenting the results is performed using a sub-process comprising:
scanning the subject lines of all results that are e-mails in the user-device;
ranking by the processor of one or more words according to the number of occurrences, wherein the one or more words do not include an article or a conjunction;
selecting by the processor of one or more words out of the ranked one or more words based on a pre-defined parameter for creating a manageable number of folders; and
creating folders in the processor corresponding to each of the selected words, wherein the folder of each selected word comprises the results in which the word occurs in the subject line.

* * * * *